United States Patent

Omori et al.

Patent Number: 6,115,058
Date of Patent: Sep. 5, 2000

[54] IMAGE DISPLAY SYSTEM

[75] Inventors: Shigeru Omori; Jun Suzuki, both of Nakai-machi, Japan

[73] Assignee: Terumo Kabushiki Kaisha, Tokyo, Japan

[21] Appl. No.: 09/008,629

[22] Filed: Jan. 16, 1998

Related U.S. Application Data

[63] Continuation of application No. 08/311,734, Sep. 23, 1994.

[30] Foreign Application Priority Data

| Dec. 3, 1993 | [JP] | Japan | 5-304384 |
| Dec. 3, 1993 | [JP] | Japan | 5-304457 |
| Dec. 3, 1993 | [JP] | Japan | 5-304458 |
| Dec. 3, 1993 | [JP] | Japan | 5-304459 |
| Dec. 3, 1993 | [JP] | Japan | 5-304460 |
| Dec. 3, 1993 | [JP] | Japan | 5-304467 |

[51] Int. Cl.[7] .................................................. H04N 13/00
[52] U.S. Cl. .................. 348/45; 382/2; 382/173; 382/115; 345/6; 358/88; 600/111
[58] Field of Search .................. 248/42–46, 51, 248/54–56, 59, 592, 370, 371, 169, 171, 172; 382/118, 288

[56] References Cited

U.S. PATENT DOCUMENTS

| 3,218,339 | 11/1965 | Wupper | 348/370 |
| 4,385,316 | 5/1983 | Yanagisawa . | |

(List continued on next page.)

FOREIGN PATENT DOCUMENTS

| 0505998 A3 | 9/1992 | European Pat. Off. . |
| 0 576 106 | 12/1993 | European Pat. Off. . |
| 0 595 023A1 | 5/1994 | European Pat. Off. . |
| 0 601 308 | 6/1994 | European Pat. Off. . |
| 0602934 A2 | 6/1994 | European Pat. Off. . |
| 0602934A2 | 6/1994 | European Pat. Off. . |
| 41 02 895C1 | 1/1992 | Germany . |
| 93 00 765 | 5/1993 | Germany . |
| 63-127777 | 5/1988 | Japan . |
| 63-194497 | 8/1988 | Japan . |
| 5-22722 | 1/1993 | Japan . |
| 2 111 798A | 7/1983 | United Kingdom . |
| 2 206 763 | 1/1989 | United Kingdom . |
| 83/02169 | 6/1983 | WIPO . |
| WO83/02169 | 6/1983 | WIPO . |
| WO93/19394 | 10/1993 | WIPO . |

OTHER PUBLICATIONS

Alfred Schwartz, 1985 International Display Research Conference; "Head Tracking Stereoscopic Display"; CH2239–2/85/0000–0141 1985 IEEE.

(List continued on next page.)

*Primary Examiner*—Andy Rao
*Assistant Examiner*—Shawn S. An
*Attorney, Agent, or Firm*—Burns, Doane, Swecker & Mathis, LLP

[57] ABSTRACT

An image display system which provides first and second images such that the right eye and the left eye of an observer see the first and second images at different times, respectively. The image display system comprises a camera for taking a picture of the observer and then outputting an image of the observer; a liquid crystal display device transparent to light, for displaying the first and second images at the different times, respectively; a back-lighting device which displays back light images to illuminate the liquid crystal display device from a back side thereof, at the different times; and an optical element for giving directivity to back light emitted by the back-lighting device so that the back-lighting device provides back light illuminations of the LCD device for the right and left eyes at the different times. The apparatus detects centroids or contours of images of the observer taken by the camera, and generates the back-light images on the basis of the centroids or contours. The apparatus synchronizes the display of the back-light images with the display of the first and second images, respectively.

10 Claims, 19 Drawing Sheets

U.S. PATENT DOCUMENTS

| | | |
|---|---|---|
| 4,535,354 | 8/1985 | Rickert . |
| 4,641,178 | 2/1987 | Street . |
| 4,647,966 | 3/1987 | Phillips et al. . |
| 4,649,425 | 3/1987 | Pund . |
| 4,717,949 | 1/1988 | Eichenlaub . |
| 4,829,365 | 5/1989 | Eichenlaub . |
| 4,870,600 | 9/1989 | Hiraoka . |
| 4,890,902 | 1/1990 | Doane et al. . |
| 4,922,336 | 5/1990 | Morton . |
| 4,962,422 | 10/1990 | Ohtomo et al. ............... 358/88 |
| 4,987,487 | 1/1991 | Ichinose et al. . |
| 5,008,658 | 4/1991 | Russay et al. . |
| 5,032,912 | 7/1991 | Sakariassen . |
| 5,059,957 | 10/1991 | Todoriki et al. . |
| 5,132,839 | 7/1992 | Travis . |
| 5,162,785 | 11/1992 | Fagard . |
| 5,311,220 | 5/1994 | Eichenlaub ............... 345/55 |
| 5,315,377 | 5/1994 | Isono et al. . |
| 5,365,370 | 11/1994 | Hudgins . |
| 5,408,264 | 4/1995 | Kurata et al. . |
| 5,410,609 | 4/1995 | Kado et al. ............... 382/2 |
| 5,421,589 | 6/1995 | Monroe . |
| 5,430,474 | 7/1995 | Hines . |
| 5,430,809 | 7/1995 | Tomitaka ............... 348/169 |
| 5,457,574 | 10/1995 | Eichenlaub . |
| 5,459,605 | 10/1995 | Kempf . |
| 5,494,483 | 2/1996 | Adair ............... 348/45 |
| 5,499,303 | 3/1996 | Hundt et al. . |
| 5,568,314 | 10/1996 | Omori et al. . |
| 5,754,900 | 5/1998 | Suda ............... 396/296 |
| 5,774,175 | 6/1998 | Hattori . |

OTHER PUBLICATIONS

J.R. Moore et al., "The Implementation of a Multi–view Autostereoscopic Display," *Image Technology*, (Journal of the BKSTS), vol. 75, No. 1, Jan./Feb. 1993, pp. 6–11.

K.E. Jachimowicz, et al., "Stereoscopic (3–D) projection display using polarized color multiplexing," Optical Engineering, vol. 29, Aug. 1990.

K. Yamamoto, et al., "Automatic Viewing Range Tracing Method for Communication Equipment", IEEE Transactions on Consumer Electronics, Aug. 1991, No. 3, vol. 37, pp. 424–431.

Alfred Schwartz, 1985 International Display Research Conference; "Head Tracking Stereoscopic Display"; CH2239–2/85/0000–0141 1985 IEEE.

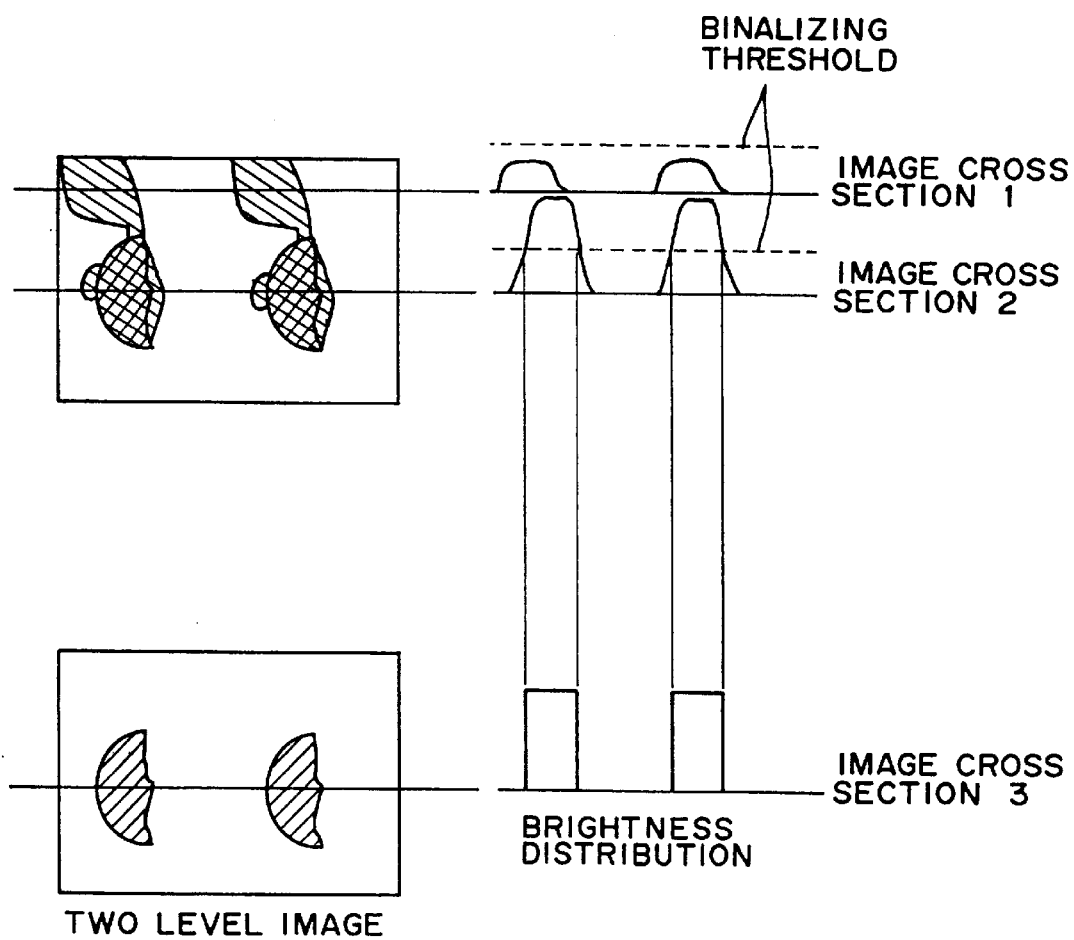

IMAGE DISPLAY SYSTEM

This application is a continuation of application Ser. No. 08/311,734, filed Sep. 23, 1994.

BACKGROUND OF THE INVENTION

1. Field of the Invention

The present invention relates to a display system for displaying an image, and more particularly to a display system for displaying a stereoscopic image for industrial, medical, or domestic use.

2. Description of the Related Art

In a conventional stereoscopic display system, an observer wears glasses for separating right and left images from each other whereby right and left eyes of the observer can selectively see right and left target images, respectively, which are displayed on an image screen in a time-division fashion. In another conventional technique, a lenticular plate is attached to an image screen so that the lenticular plate can separate right and left images from each other and thus right and left eyes of the observer can selectively see right and left target images, respectively.

FIG. 1 illustrates an example of the configuration of the above-described conventional stereoscopic-image display system, which includes glasses 60 capable of separating right and left images from each other, liquid crystal shutters 61a and 61b, a synchronous circuit 62, and color CRT 63 serving as an image display device.

The above first example of a stereoscopic-image display system having such a configuration operates as follows. The color CRT 63 displays stereoscopic images wherein images for right and left eyes are displayed alternately in a time-division fashion. Under the control of the synchronous circuit 62, the liquid crystal shutter 61a of the glasses 60 is opened and thus become transparent only when stereoscopic images for the right eye are displayed, and the liquid crystal shutter 61b is opened and become transparent only when stereoscopic images for the left eye are displayed. As a result, an observer wearing the glasses 60 can observe stereoscopic images for the right eye with his or her right eye, and stereoscopic images for the left eye with the left eye. In this way, stereoscopic vision is provided.

FIG. 2 illustrates the configuration of the second example of a conventional stereoscopic-image display system, which includes a lenticular plate 71 having a large number of stripe-shaped cylindrical lenses and a color CRT 72 serving as an image display device.

This second example of stereoscopic-image display system having such a configuration operates as follows. The color CRT 72 displays simultaneously both stereoscopic images for right and left eyes such that images for right and left eyes are displayed alternately on each half-width stripe of the lenticular plate 71. The right eye of an observer sees only the stereoscopic images for the right eye displayed on the above-described slit-shaped zones through corresponding cylindrical lenses of the lenticular plate 71, and the left eye sees only the stereoscopic images for the left eye displayed on the slit-shaped zones, whereby stereoscopic vision is obtained.

In the first example of the conventional stereoscopic-image display system, however, an observer has to wear troublesome and uncomfortable glasses which separately provide stereoscopic images to right and left eyes of the observer. Another problem in observing stereoscopic images using this technique is flicker due to the switching between the stereoscopic images for right and left eyes.

In the second example of the conventional stereoscopic-image display system, since a stereoscopic image is observed via stripe-shaped lenses, stereoscopic vision can be obtained only when an observer is in a limited narrow area. If the observer moves, degradation occurs in the image. Besides, only a few observers at various positions can observe an image at the same time. Furthermore, image processing is required to provide a stripe-shaped image, which needs an expensive apparatus.

In medical applications, when an endoscopic operation is used, an operator observes a plane image of the inside of a patient's abdominal cavity displayed on a monitor via an endoscope. However, the monitored image of the inside of the abdominal cavity has no characteristic features because the entire abdominal cavity has a single color, and thus it is difficult to give perspective vision. This causes a long operation time, and gives heavy loads to both surgeon and patient. On the other hand, when a conventional stereoscopic-image display system of the above-described first or second type is used in the operation, there are serious problems in practical use such as uncomfortable glasses for separating right and left images, flicker of an image, and limitation in movement of an observer.

SUMMARY OF THE INVENTION

It is an object of the present invention to solve the above-described problems.

It is another object of the present invention to provide an inexpensive and small-sized image display system which can provide different images to right and left eyes of an observer without using glasses for separating a right-eye image and left-eye image from each other.

To achieve the objects, the present invention provides an image display system for providing first and second images such that a right eye and a left eye of an observer see the first and second images at different times, respectively, the image display system comprising:

picture-taking means for taking a picture of the observer and then outputting an image of the observer;

a spatial modulation device transparent to light, for displaying the first and second images at the different times, respectively;

generation means for generating a pair of back light images based on an image output signal from the picture-taking means at the different times, respectively;

a back-lighting device which receives an output signal associated with the back light image generated by the back light image generation means and displays the back light images to illuminate the spatial modulation devices from a back side thereof, at the different times;

synchronization means for synchronizing one of the first and second images present on the pair of spatial modulation devices with a generation of one of the pair of back light images by the generation means; and an optical element for giving directivity to back light emitted by the back-lighting device so that the back-lighting device provides back light illuminations of the spatial modulation device for the right and left eyes at the different times, wherein the generation means comprises:

image processing means for processing an image of the observer taken by the picture taking means, detecting a contour and/or a centroid of the face area of the image of the observer, and then generating the pair of back light images on the basis of the detected contour and/or centroid.

Thus constructed apparatus can generate the first and second backlight images easily and therefore can display the images in a small size fashion.

To achieve the above objects, the present invention provides another image display system for providing first and second images such that a right eye and a left eye of an observer see the first and second images at different times, respectively, the image display system comprising:

picture-taking means for taking a picture of the observer and then outputting an image of the observer;

a spatial modulation device transparent to light, for displaying the first and second images at the different times, respectively;

generation means for generating a pair of back light images based on an image output signal from the picture-taking means at the different times, respectively;

a back-lighting device which receives an output signal associated with the back light image generated by the back light image generation means and displays the back light images to illuminate the spatial modulation devices from a back side thereof, at the different times;

synchronization means for synchronizing one of the first and second images present on the pair of spatial modulation devices with a generation of one of the pair of back light images by the generation means; and an optical element for giving directivity to back light emitted by the back-lighting device so that the back-lighting device provides back light illuminations of the spatial modulation device for the right and left eyes at the different times, wherein the picture-taking means comprises:

a plurality of camera means having different sensitivity characteristics; and a plurality of illumination means having characteristics corresponding to the sensitivity characteristics of the plurality of camera means;

wherein the plurality of camera means and the plurality of illumination means are disposed in front of the plurality of observers in such a manner that they are distributed in the direction from the front to the back of the plurality of observers.

The above constructed apparatus, where the observers are distributed in a wide area, can provide to the observers with a vision of the first and second images.

According one aspect of the present invention as constructed above, the plurality of illumination means and the plurality of camera means are distributed in the direction from the left to the right as well as in the direction from the front to the back of the plurality of observers.

According another aspect of the present invention as mentioned above, the plurality of camera means comprise a plurality of pairs of cameras, and the plurality of illumination means comprise a plurality of pairs of illuminating devices, each pair of illuminating devices are distributed in a transversal direction before the observes, and illuminate the observer faces in such a manner that a right-side face area and a left-side face area are illuminated with light having different wavelengths;

the plurality of pairs of cameras are distributed in the transverse and back-and forth directions of the observers, each pair of cameras taking a picture of said observer's face in such a manner that each said camera selectively takes a picture in response to light having a corresponding wavelength.

To achieve the above objects, the present invention provides a further image display system for providing first and second images such that a right eye and a left eye of an observer see the first and second images at different times, respectively, the image display system comprising:

picture-taking means for taking a picture of the observer and then outputting an image of the observer;

a spatial modulation device transparent to light, for displaying the first and second images at the different times, respectively;

generation means for generating a pair of back light images based on an image output signal from the picture-taking means at the different times, respectively;

a back-lighting device which receives an output signal associated with the back light image generated by the back light image generation means and displays the back light images to illuminate the spatial modulation devices from a back side thereof, at the different times;

synchronization means for synchronizing one of the first and second images present on the pair of spatial modulation devices with a generation of one of the pair of back light images by the generation means; and an optical element for giving directivity to back light emitted by the back-lighting device so that the back-lighting device provides back light illuminations of the spatial modulation device for the right and left eyes at the different times, wherein the generation means comprises:

means for processing the image of the observer taken by said picture-taking means in such a manner that the positions of bright points associated with the image of the observer are detected and then said pair of back light images are generated on the basis of said detected positions of bright points.

Since the detected positions of bright points represent the position of the observer, thus constructed system can provide the first and second images precisely.

To achieve the above objects, the present invention provides a further image display system for providing first and second images such that a right eye and a left eye of an observer see the first and second images at different times, respectively, the image display system comprising:

picture-taking means for taking a picture of the observer and then outputting an image of the observer;

a spatial modulation device transparent to light, for displaying the first and second images at the different times, respectively;

generation means for generating a pair of back light images based on an image output signal from the picture-taking means at the different times, respectively;

a back-lighting device which receives an output signal associated with the back light image generated by the back light image generation means and displays the back light images to illuminate the spatial modulation devices from a back side thereof, at the different times;

synchronization means for synchronizing one of the first and second images present on the pair of spatial modulation devices with a generation of one of the pair of back light images by the generation means; and an optical element for giving directivity to back light emitted by the back-lighting device so that the back-lighting device provides back light illuminations of the spatial modulation device for the right and left eyes at the different times, wherein the optical element is a Fresnel lens formed on a surface of the spatial modulation device in an integral fashion.

The Fresnel lens makes thus constructed display system small size.

According to one aspect of the thus constructed system, the Fresnel lens is provided on the back surface of the spatial modulation device that is closer to the back-lighting device.

According to another aspect of the thus constructed system, the spatial modulation device comprising a liquid crystal display device which has a glass substrate on a back surface thereof, the glass which is provided with a pattern of ring bands serving as a Fresnel lens.

To achieve the objects, the present invention provides a further image display system for providing first and second images such that a right eye and a left eye of an observer see the first and second images at different times, respectively, the image display system comprising:

picture-taking means for taking a picture of the observer and then outputting an image of the observer;

a spatial modulation device transparent to light, for displaying the first and second images at the different times, respectively;

generation means for generating a pair of back light images based on an image output signal from the picture-taking means at the different times, respectively;

a back-lighting device which receives an output signal associated with the back light image generated by the back light image generation means and displays the back light images to illuminate the spatial modulation devices from a back side thereof, at the different times;

synchronization means for synchronizing one of the first and second images present on the pair of spatial modulation devices with a generation of one of the pair of back light images by the generation means; and an optical element for giving directivity to back light emitted by the back-lighting device so that the back-lighting device provides back light illuminations of the spatial modulation device for the right and left eyes at the different times, wherein the back light device displays images with two-level gradation having a threshold value equal to predetermined brightness.

Where the back-light images are displayed on the back-lighting device which can afford two level gradation display, crosstalk are reduced between the images.

According to one aspect of the various display systems above described, the generation means generates a back light image corresponding to the image of the observer's face taken by the picture-taking means.

According to another aspect of the various display systems above described, the picture-taking means separates an image of a left-side face area and an image of right-side face area from the image of the observer's face, and then displays the image of the left-side face area and the image of right-side face area on the pair of back-lighting device, respectively.

According to further aspect of the various display systems above described, the picture-taking means includes:

a pair of illuminating devices for illuminating an observer face in such a manner that a right-side face area and a left-side face area are illuminated with light having different wavelengths;

a pair of cameras for taking a picture of the observer's face in such a manner that each the camera selectively takes a picture in response to light having the corresponding wavelength.

According to further aspect of the various display systems above described, the system further comprises:

means for determining the different between a pair of image signals associated with the observer obtained via the pair of cameras, and further removing a background image from the pair of image signals on the basis of the different.

According to a further aspect of the various display systems above described, the pair of illuminating devices are attached to the observer so that the pair of illuminating devices move following the movement of the head of the observer.

According to a further aspect of the various display systems above described, the pair of cameras are each provided with a wavelength filter which selectively passes light emitted by the pair of illuminating devices.

According to a further aspect of the various display systems above described, the back lighting device is disposed outside the focal length of the optical element.

According to a further aspect of the various display systems above described, the optical element is disposed between the spatial modulation device and the back-lighting device.

According to a further aspect of the various display systems above described, the spatial modulation device comprises a liquid crystal display device.

According to a further aspect of the various display systems above described, the spatial modulation device inputs image signals representing the first and second images taken by an endoscope device; and wherein the endoscope device includes:

a pair of lens tubes for transmitting images of an object to be observed as stereoscopic vision, the images of the object being taken at two different viewing angles; and a pair of image sensing devices for converting the pair of obtained images to corresponding electric signals.

According to a further aspect of the various display systems above described, the lens is a convex lens, concave mirror or Fresnel lens.

To achieve the above objects, the present invention provides another image display system for providing first and second images such that a right eye and a left eye of an observer see the first and second images at different times, respectively, the image display system comprising:

picture-taking means for taking a picture of the observer and then outputting an image of the observer;

generation means for generating a pair of back light images based on an image output signal from the picture-taking means;

a spatial modulation device having first and second liquid crystal layers transparent to light, for displaying the first and second images in a time division fashion;

a back-lighting device for illuminating the spatial modulation device from a back side thereof by displaying the back light images; and an optical element, disposed between the spatial modulation device and the back-lighting device, for giving directivity to back light emitted by the back-lighting device so that the back-lighting device provides back light illuminations of the spatial modulation device for the right and left eyes, wherein the back light images are displayed in a time-division fashion in a synchronization with a time division display of the spatial modulation device, the back light images being displayed at positions corresponding to the right and left face areas, respectively.

To achieve the above objects, the present invention provides another image display system for providing first and second images such that a right eye and a left eye of an observer see the first and second images at different times, respectively, the image display system comprising:

detecting means for detecting a position of the observer;

generation means for generating a pair of back light images based on a detected position of the observer;

a spatial modulation device having first and second liquid crystal layers transparent to light, for displaying the first and second images in a time division fashion;

a back-lighting device for illuminating the spatial modulation device from a back side thereof by displaying the back light images; and an optical element, disposed between the spatial modulation device and the back-lighting device, for giving directivity to back light emitted by the back-lighting device so that the back-lighting device provides back light illuminations of the spatial modulation device for the right and left eyes, wherein the back light images are displayed in a time-division fashion in a synchronization with a time division display of the spatial modulation device, the back light images being displayed at positions corresponding to the right and left face areas, respectively.

The time division based display of the target images on the spatial modulation device with synchronization with the display of the back light images eliminates a crosstalk and flickers on the modulation device due to slow response of the modulation device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a pair of the specification, illustrate embodiments of the invention and, together with the description, serve to explain the principles of the invention.

FIGS. 20A and 20B are schematic diagram illustrating advantages of the back-lighting devices capable of displaying two-level back-light images.

DETAILED DESCRIPTION OF THE PREFERRED EMBODIMENTS

Referring to accompanying drawings, display systems for providing a stereoscopic image according to the present invention will be described below.

First Embodiment

Figure 1:
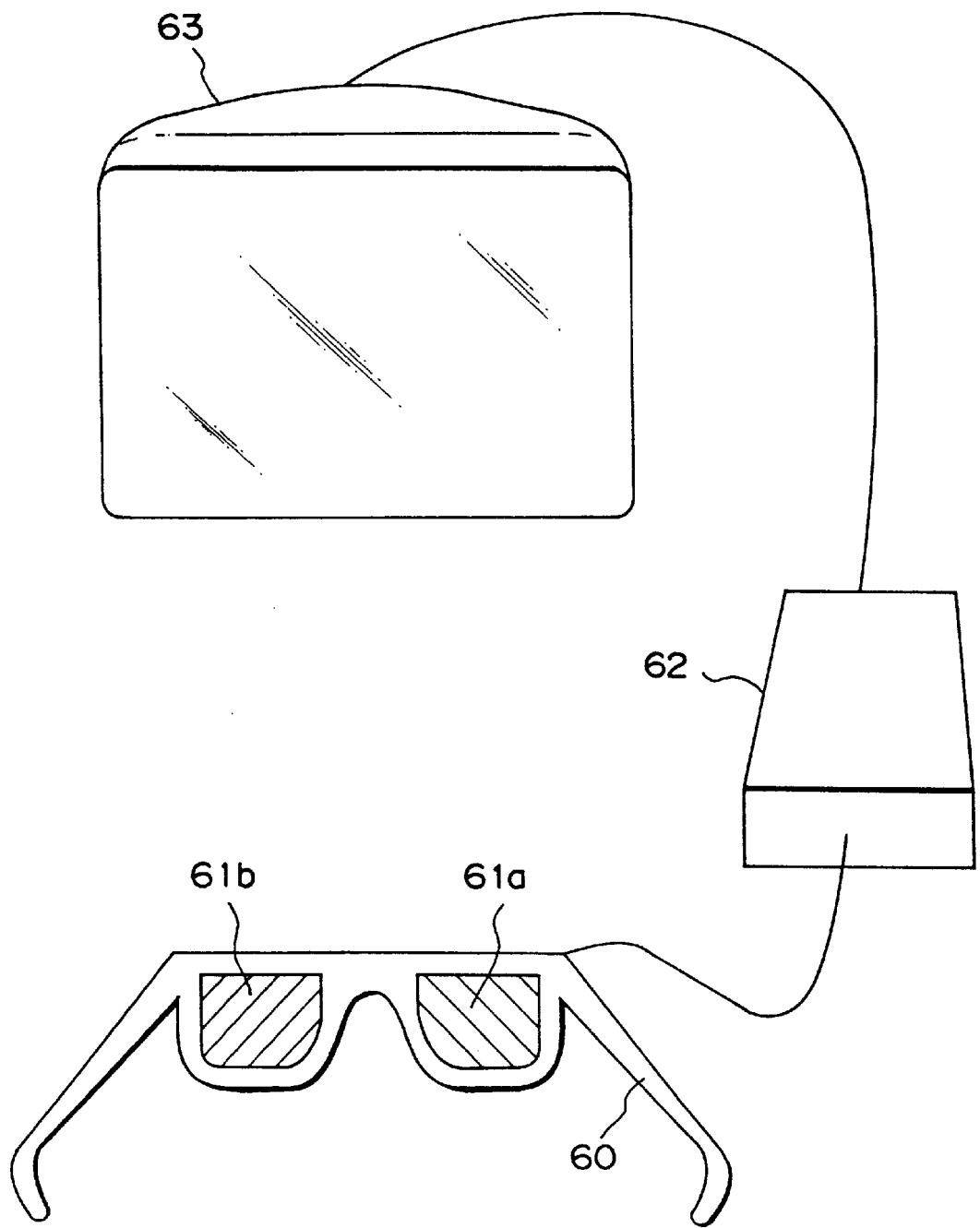
FIG. 1 is a schematic diagram illustrating a first example of a conventional stereoscopic-image display system.
Figure 2:
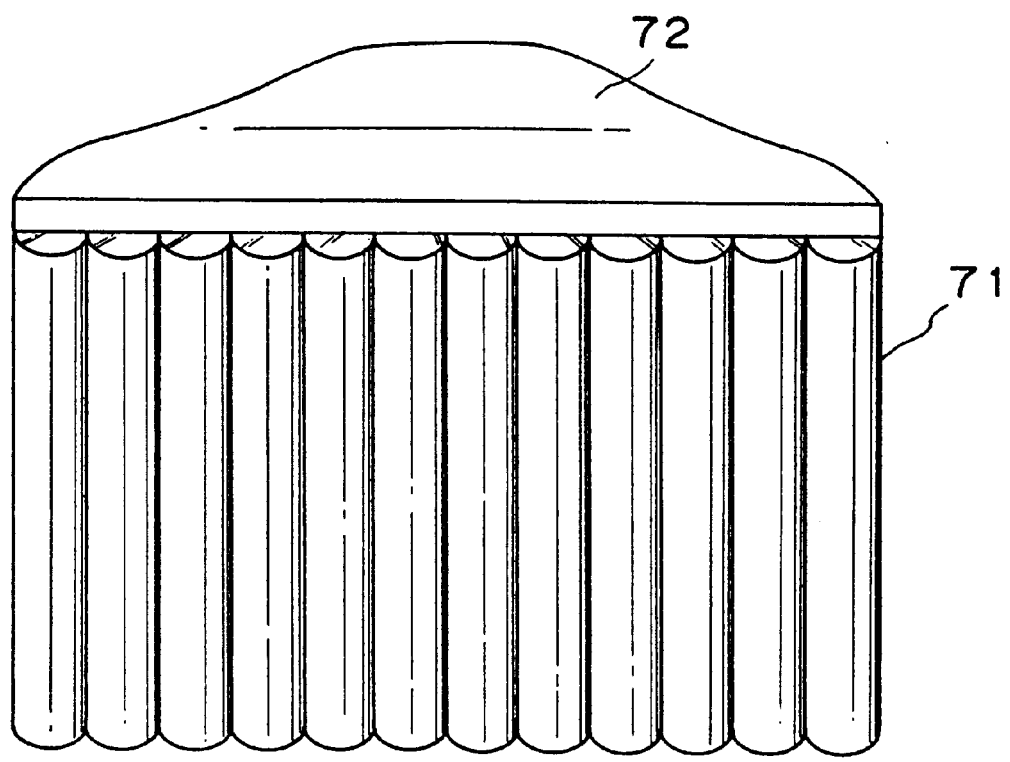
FIG. 2 is a schematic diagram illustrating a second example of a conventional stereoscopic-image display system.
Figure 3:
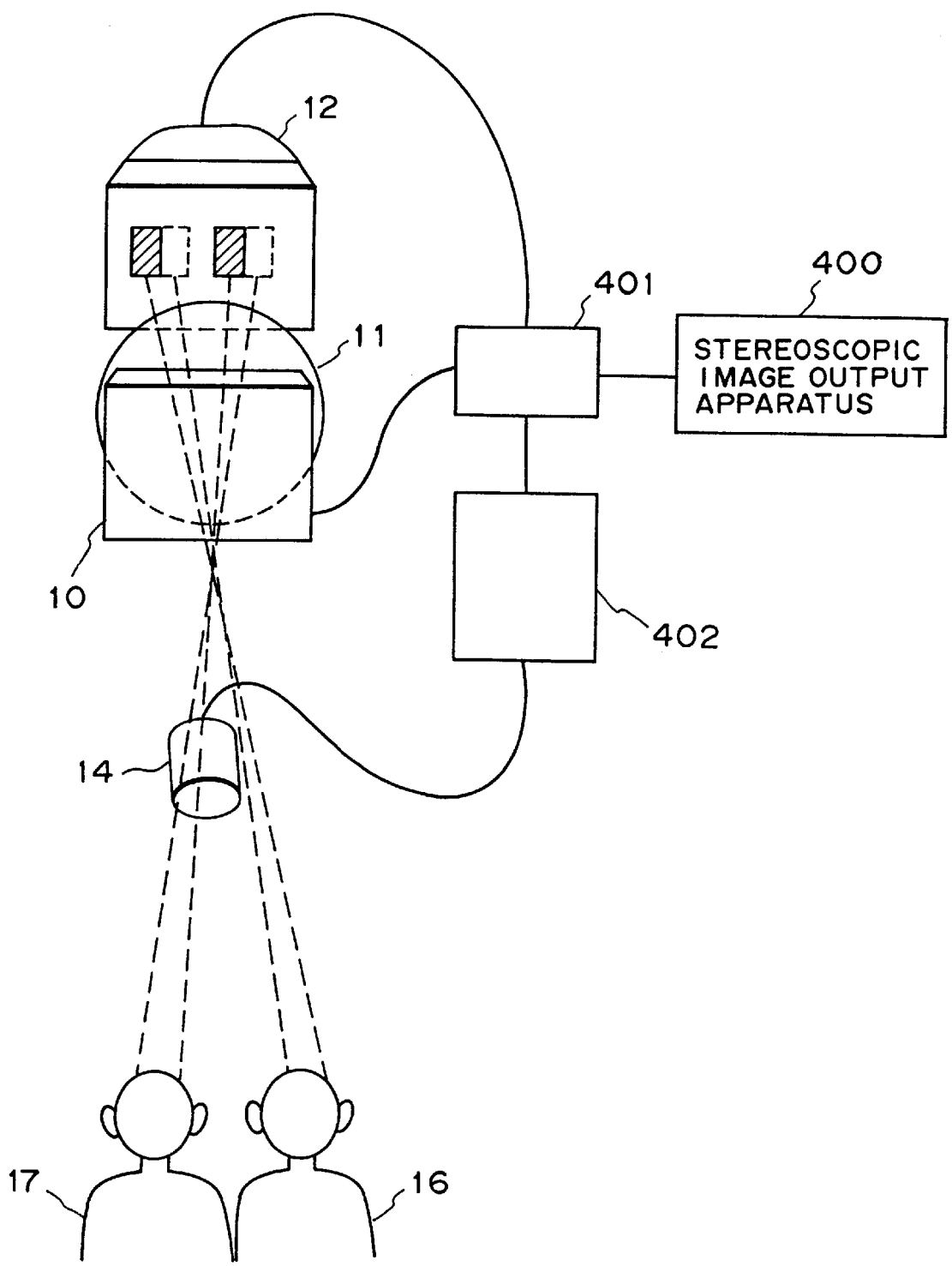
FIG. 3 is a schematic diagram illustrating a first embodiment of a stereoscopic-image display system according to the present invention.

FIG. 3 illustrates the construction of the first embodiment of the stereoscopic-image display system according to the present invention.

As shown in FIG. 3, the system includes: a transmission-type of liquid crystal display 10 serving as a spatial modulation device; a Fresnel lens 11, serving as an optical element, having a focal length of 150 mm disposed at the back of the spatial modulation device 10; a black-and-white CRT 12 serving as a back-lighting device which emits light in response to observers' images wherein the black-and-white CRT 12 is disposed opposite to the spatial modulation device 10 via the lens 11 at a position 160 mm away from the lens 11 which is longer than the focal length of the lens 11; a CCD camera 14 serving as an image sensing means of picture-taking apparatus; an image processing unit 402 for producing images approximating images of right-side and left-side areas of the observer's face from the image of the observer taken by the camera 14; and a synchronous circuit 401 for synchronizing the above-described images provided by the image processing unit 402 with right-eye and left-eye target images provided by a stereoscopic image output device 400. In FIG. 3, there are also shown observers 16 and 17 who observe a stereoscopic image.

Figure 4:
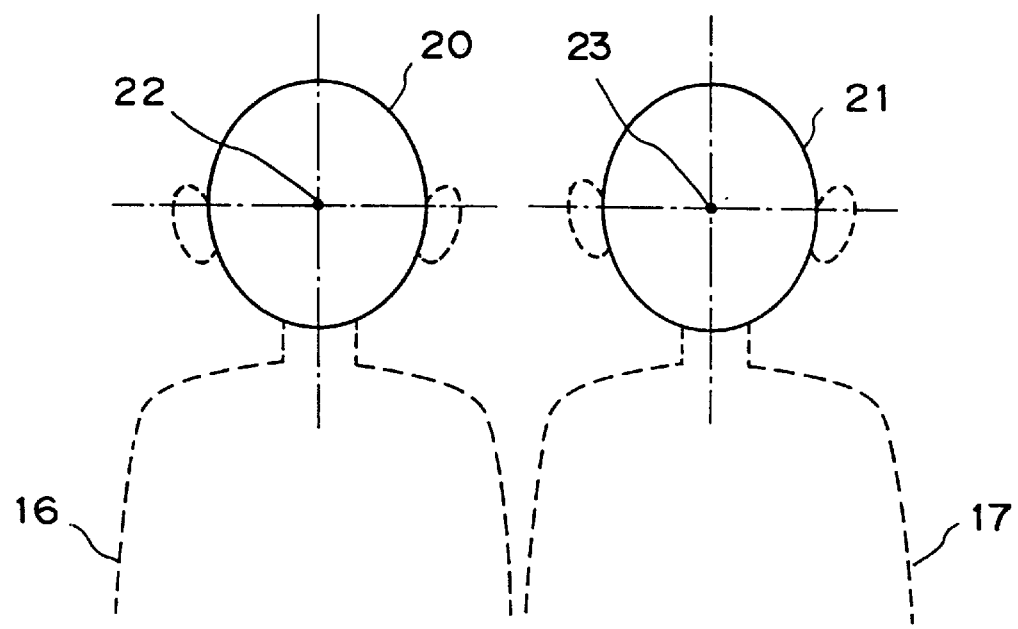
FIG. 4 is a schematic diagram illustrating the operation of the first embodiment of the stereoscopic-image display system according to the present invention.
Figure 5A:
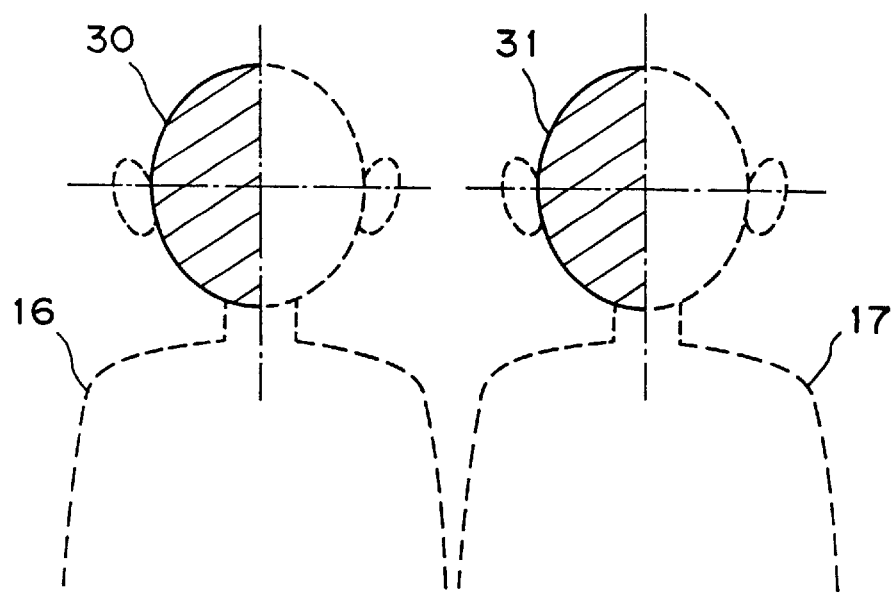
FIGS. 5A and 5B are schematic diagrams illustrating the operation of the first embodiment of the stereoscopic-image display system according to the present invention.
Figure 5B:
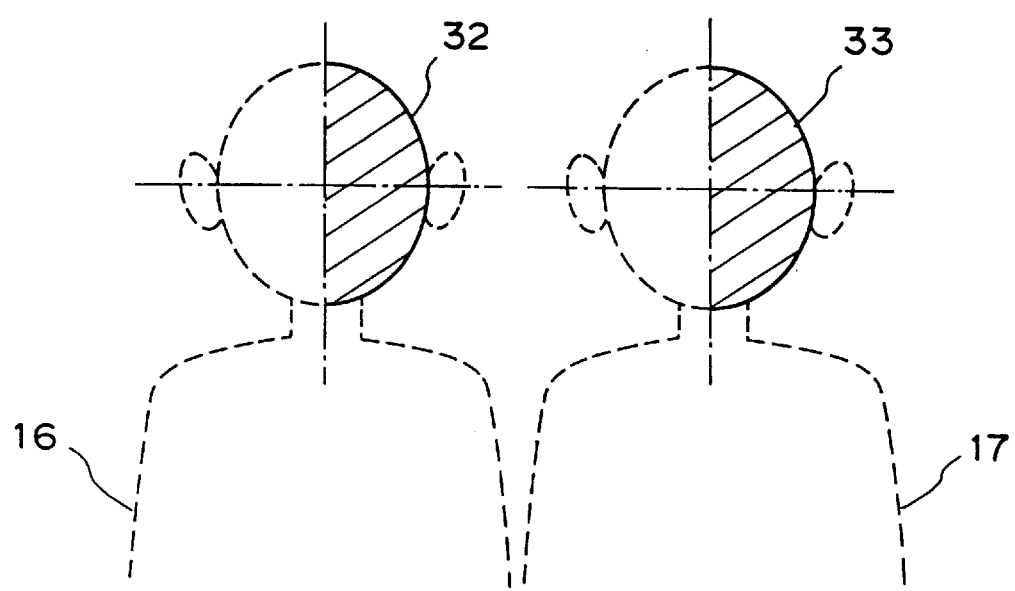

FIG. 4 and FIGS. 5A, 5B illustrate how images of observers 16 and 17 taken by the CCD camera 14 are processed by the image processing unit 402.

If light emitted from a light source (not shown) is projected only onto faces of observers, then an image obtained by the camera 14 consists mainly of the faces of the observers. In FIG. 4, reference numerals 20 and 21 denote contours of observers. The image processing unit 402 performs edge-extraction processing on the image signal output by the camera 14 (using for example a Laplacian filter) so as to extract its edge.

The image processing unit 402 calculates areas of regions surrounded by contours 20 and 21, respectively, and further determines the center of area associated with each region (face region) surrounded by contours 20 and 21. The obtained positions of the area centers of the respective regions surrounded by contours 20 and 21, respectively, are denoted by reference numerals 22 and 23 in FIG. 4.

FIG. 5A, reference numerals 30 and 31 denote images corresponding to right-side areas of face regions surrounded by contours 20 and 21, respectively, wherein these images 30 and 31 are produced based on centers of areas 22 and 23, respectively.

Similarly, reference numerals 32 and 33 in FIG. 5B denote images corresponding to left-side areas of face regions produced based on centers of areas 22 and 23. In the above processing, shapes of observers faces are known. Images 30, 31, 32, and 33 are produced from an image having a shape similar to that of a human face which has been prepared beforehand and is stored in the image processing unit 402. After determining each position of the center of area, the image processing unit 402 produces images in such a manner that the determined positions become centers of respective images.

Figure 6:
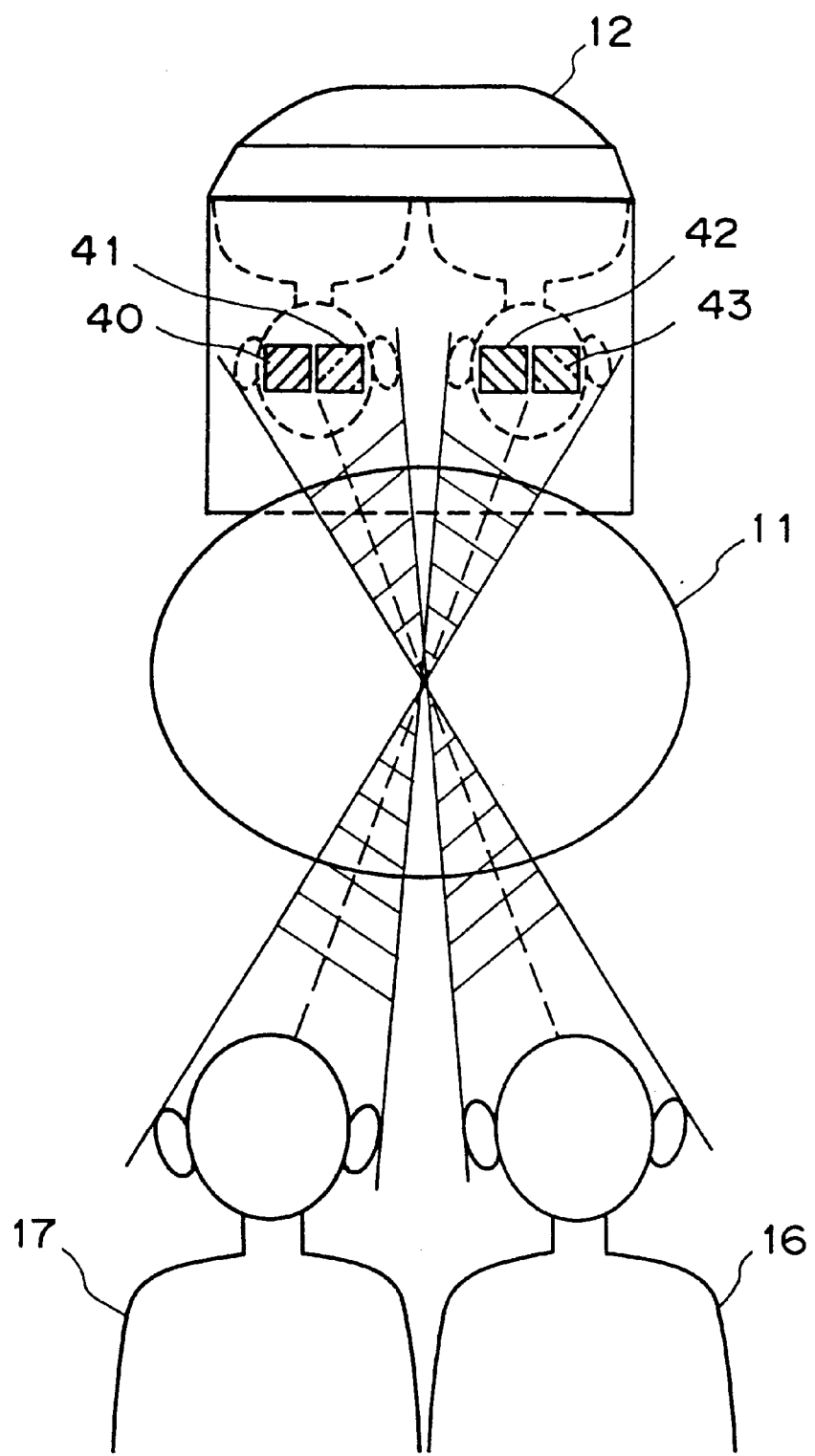
FIG. 6 is a schematic diagram illustrating the operation of the first embodiment of the stereoscopic-image display system according to the present invention.

In FIG. 6, observes see virtual images extracted from their own faces according to the first embodiment shown in FIG. 3. For simplicity, only a back-lighting device (a black-and-white CRT) and a lens are shown, and the other elements such as a liquid crystal display, picture-taking apparatus, image processing unit, etc. are not shown in FIG. 6. In this FIG. 6, reference numerals 11 denotes a lens; 12 denotes a black-and-white CRT; 16 and 17 denote two observers who are observing a stereoscopic image; and 40, 41, 42, and 43 denote areas of observers' images displayed on the black-and-white CRT 12 wherein these areas are actually seen by the observers.

The operation of the stereoscopic-image display system constructed in the above-described manner will be explained referring to FIGS. 3 through 6.

In FIG. 3, signals associated with right-eye and left-eye images are output by the stereoscopic image output device such as video tape recorder, laser disk player, or a pair of television cameras to the liquid crystal display 10. The liquid crystal display 10 then displays right-eye and left-eye images alternately in a time-sharing fashion so as to form a stereoscopic image. In this time-sharing display of images, it is preferable that images be displayed alternately at a rate of 20–60 frames per second. If the display rate is less than 20 frames per second, flicker appears in images to a degree unsuitable for observation. On the other hand, if the display rate is greater than 60 frames per second, the liquid crystal display 10 cannot respond at such a high rate, and therefore crosstalk occurs between images for the right and left eyes in which the left eye (right eye) can see the image for the right-eye (left-eye).

The CCD camera 14 takes a picture of observers seen from the front side. An image signal obtained is applied to the image processing unit 402. The image processing unit 402 extracts contours 20, 21 of observers' faces as shown in FIG. 4, and then detects the centroids 22 and 23 of regions surrounded by these contours 20 and 21, respectively. The image processing unit 402 further divides each face contour 20, 21 into right and left areas employing each centroid 22, 23 as the symmetry center, and produces half-face images 30, 31, 32, and 33 as shown in FIGS. 5A and 5B. The right half-face images 30, 31 and the left half-face images 32, 33 are alternately displayed with high brightness in a time-sharing fashion and in a upside-down fashion on the black-and-white CRT 12.

As described above, both liquid crystal display 10 and black-and-white CRT 12 display right-eye and left-eye images alternatively in a time-sharing fashion, wherein synchronization between these displaying processes is accomplished by the synchronous circuit 41.

Referring to FIG. 6, the function of the Fresnel lens 11 will be described below. The Fresnel lens 11 is disposed at a location which allows observers 16 and 17 to see virtual images of themselves displayed in an upside-down fashion on the black-and-white CRT 12a, wherein the black-and-white CRT 12 is placed at a location outside the focal length of the Fresnel lens 11 so that right eyes of each observer can see separately only the right-eye and left-eye areas 40, 41, respectively, of the screen of the black-and-white CRT 12, and wherein these areas 40–43 may also be enlarged within the limitation determined by the effective diameter of the Fresnel lens 11. With this arrangement, when the images 40 and 42 having shapes similar to those of right half faces of observers 16 and 17 are displayed as illuminating portion, these images 40 and 42 having shapes similar to those of right half faces of observers 16 and 17 act as selective light sources each having a diameter equal to the effective diameter of the Fresnel lens 11, which act only for the right eyes of the observers 16 and 17. When the areas 40 and 42 are displayed, the areas corresponding to the left half faces of observers 16 and 17 are not displayed. Therefore, the left eyes do not receive the light emitted by the black-and-white CRT 12. Similarly, when the images 41 and 43 having shapes similar to those of left half faces are displayed as illuminating portion, these images 41 and 43 act as selective light sources each having a diameter equal to the effective diameter of the Fresnel lens 11, which act only for the left eyes of the observers 16 and 17. When these areas 41 and 43 are displayed, the areas corresponding to the right half faces are not displayed. Therefore, the right eyes do not receive the light emitted by the black-and-white CRT 12.

According to the above-described function of the system of the first embodiment, the right-eye image or the image for right eyes displayed on the liquid crystal display 10 as shown in FIG. 3 is illuminated from its back side so that the right-eye image can be seen only by right eyes of observers 16 and 17, and the left-eye image or the image for left eyes displayed on the liquid crystal display 10 is illuminated from its back side so that the left-eye image can be seen only by left eyes of the observers 16 and 17. As a result, observers 16 and 17 can be given a stereoscopic image at the same time. In this way, the system of the present invention provides stereoscopic vision to both observers 16 and 17 at the same time. Even if the observer 16 or 17 moves, the stereoscopic vision is still provided as long as the observer is in a region which allows the CCD camera 14 to take a picture of the observer.

APPLICATION OF THE FIRST EMBODIMENT TO AN ENDOSCOPE

Figure 7:
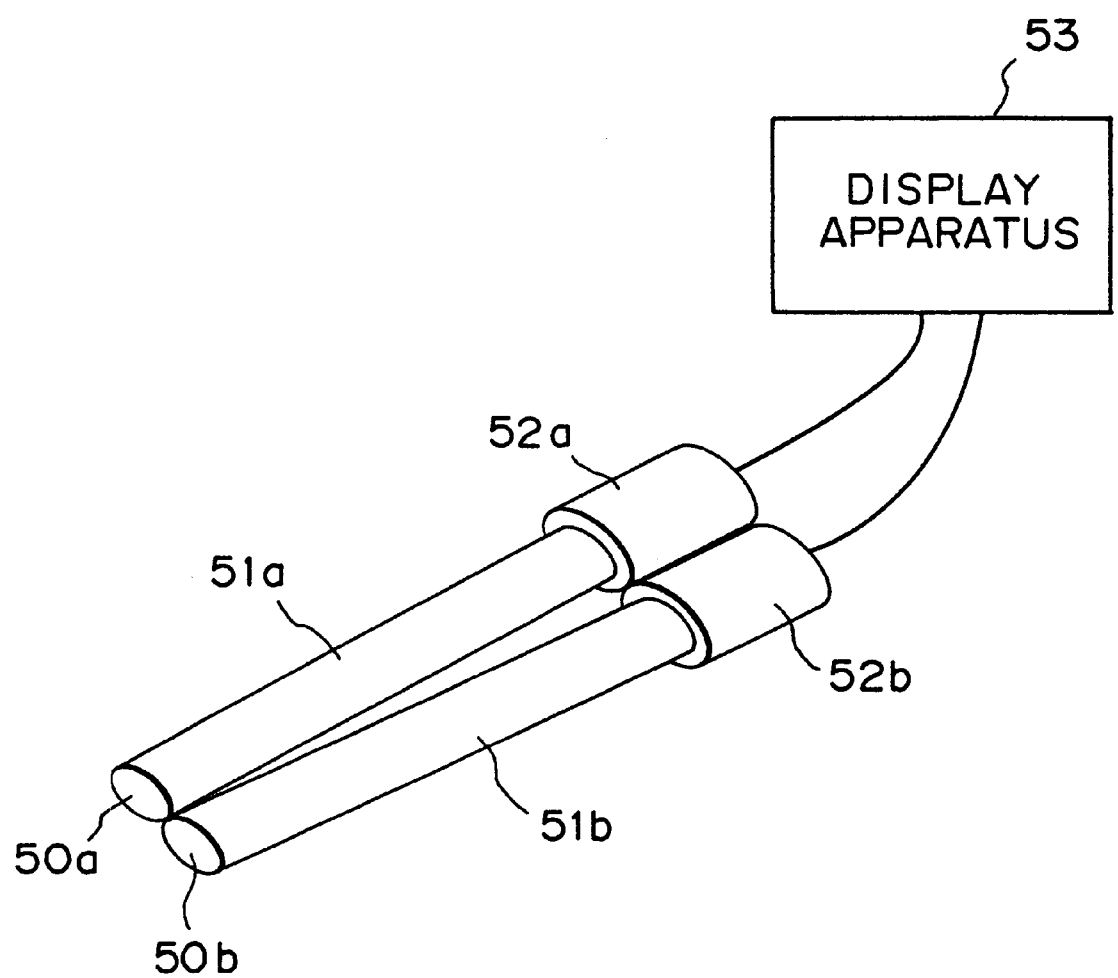
FIG. 7 is a schematic diagram illustrating a modification of the first embodiment in which the present invention is applied to an endoscope system.

FIG. 7 illustrates the construction of the first embodiment of a stereoscopic-image display system applied to an endoscope. As shown in FIG. 7, the system includes: objective lenses 50a and 50b for taking pictures of an object; lens tubes 51a and 51b having optical systems for transmitting the above obtained images wherein these lens tubes 51a and 51b are disposed at an angle corresponding to a convergence angle of observer's eyes; CCD cameras 52a and 52b; and a stereoscopic-image display system 53 described above in connection with FIG. 3.

The endoscope system constructed in the above-described manner operates as follows. Two images of an object taken via objective lenses 50a and 50b are transmitted through lens tunes 51a and 51b having the convergence angle adjusted for stereoscopic vision so as to form an image for right eyes and an image for left eyes on CCD cameras 52a and 52b, respectively, thereby providing stereoscopic vision in the endoscope. The above-described two images are applied to the stereo-scopic image output apparatus 400 (see FIG. 3), where the images are converted into time-division control signals, and are displayed on the liquid crystal display 10, thus providing a stereoscopic vision associated with the image taken by the above endoscope to a large number of observers according to functions of the stereoscopic-image display system 53 as described above in connection with the first embodiment.

Image sensing devices 52a and 52b in this embodiment of the present invention may also be disposed adjacent to the objective lenses 50a and 50b, respectively, so that electric signals representing images are produced by these image sensing devices and then transmitted through the lens tubes 51a and 51b, whereby it becomes possible to freely select the shapes of lens tubes more suitable for a specific application.

SECOND EMBODIMENT

Figure 8:
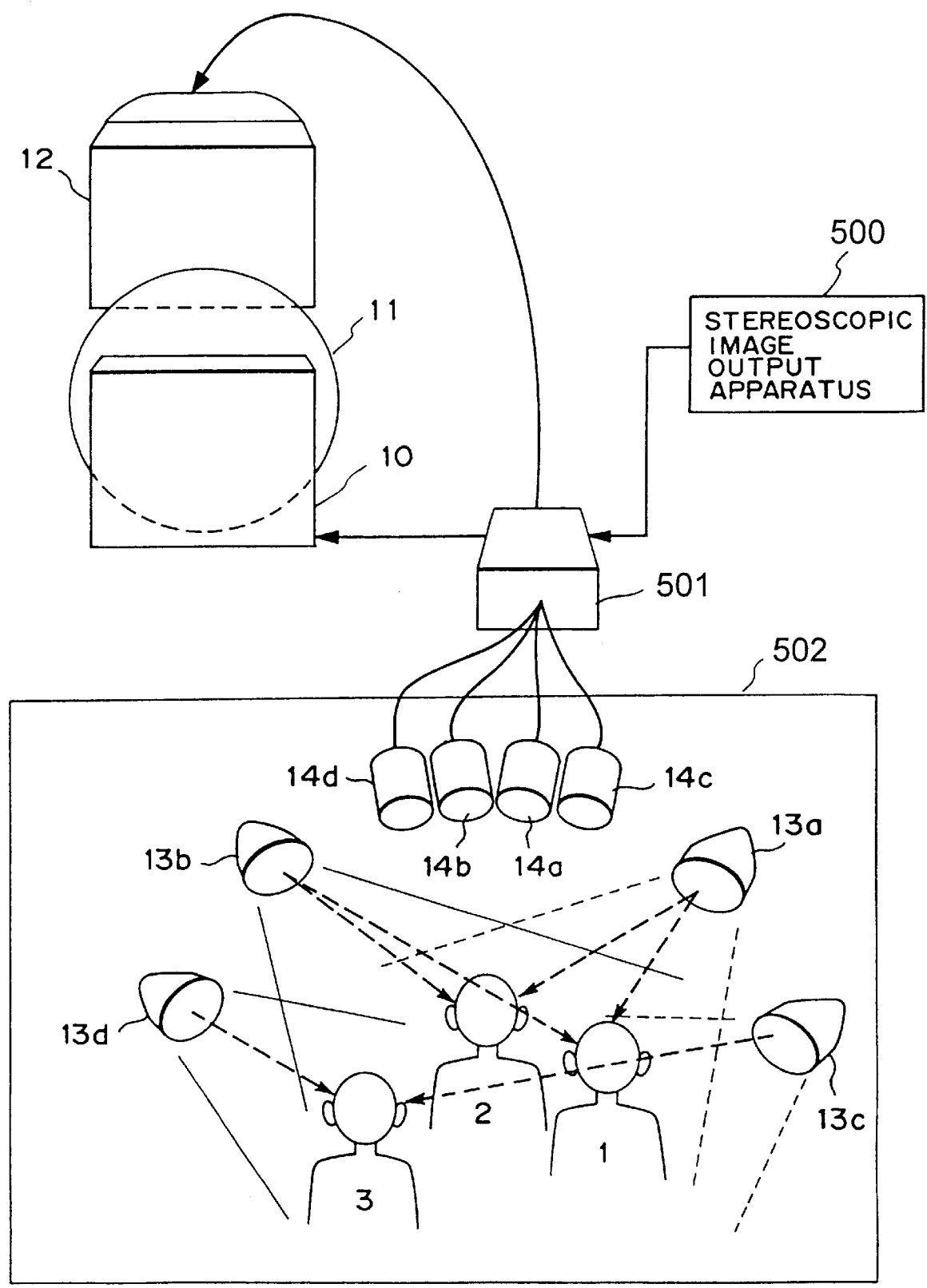
FIG. 8 is a schematic diagram illustrating a second embodiment of a stereoscopic-image display system according to the present invention.

FIG. 8 illustrates a second embodiment of a stereoscopic-image display system according to the present invention. This embodiment has the following characteristic features. Images of observers are obtained via an observer's-image taking unit 502. Images of right-side face areas of observers #1–#3 and images of left-side face areas are alternately displayed on a black-and-white CRT 12. In synchronism with the displaying operation of these images, a spatial modulation device 10 is driven alternately by an image for right eye and an image for left eye in a time-sharing fashion thereby providing a stereoscopic image to observers.

As shown in FIG. 8, the system of this embodiment includes a transmission-type liquid crystal display 10 serving as a spatial modulation device. The system further includes: a Fresnel lens 11, serving as optical element, having a focal length of 150 mm disposed at the back of the spatial modulation device 10; a black-and-white CRT 12 serving as a back-lighting device which emits light corresponding to observers' images wherein the black-and-white CRT 12 is disposed opposite to the spatial modulation device 10 via the lens 11 at a position 160 mm far from the lens 11; a circuit 210 for performing synchronization processing and image processing; and a stereoscopic image output device 500.

The device 502 includes LED light sources 13a, 13b, 13c, and 13d serving as illuminating light sources for emitting light having wavelengths 900 nm, 850 nm, 950 nm, and 800 nm, respectively; and black-and-white CCD cameras 14a, 14b, 14c, and 14d serving as apparatus for taking pictures.

In this arrangement, LED 13a and LED 13b mainly illuminate observers #1 and #2 near the system, and LED 13c and LED 13d mainly illuminate an observer #3 at a rear position. The CCD cameras 14a, 14b, 14c, and 14d are attached with wavelength filters having wavelengths 900±10 nm, 850±10 nm, 950±10 nm, and 800±10 nm, respectively, so that they can take pictures of only observers' faces illuminated with LEDs 13a, 13b, 13c, and 13d, respectively. Video signals associated with the face images of observers #1, #2, and #3 are applied to the signal processing circuit 500.

Referring to FIG. 8, the LED light source 13a illuminates the right-side face areas of the observers #1 and #2, and images of these right-side face areas are obtained via the CCD camera 14a. The LED light source 13b illuminates the left-side face areas of the observers #1 and #2, and images of these left-side face areas are obtained via the CCD camera 14b. Similarly, the LED light source 13c illuminates the right-side face area of the observer #3, and the image of this right-side face area is obtained via the CCD camera 14c. Furthermore, the LED light source 13d illuminates the left-side face area of the observer #3, and the image of this left-side face area is obtained via the CCD camera 14d. The obtained images of right and left-side face areas of observers are applied to the signal processing circuit 501.

As can be seen from this specific example, a plurality of LEDs are disposed in the direction from the front to the rear so that approximately equal illumination is provided to plural observers occupying various positions in the direction from the front to the rear. Therefore, observers can move within a wide area, and a great number of people can be observers.

In this second embodiment in which four LEDs (13a–13d) having different wave-length bands are used, there are provided four picture-taking apparatus (14a–14d) having characteristics corresponding to those of these LEDs. However, if one camera which can separate a plurality of wave-length bands and can take corresponding pictures is available, only this single camera is enough to do all required functions.

Figure 9:
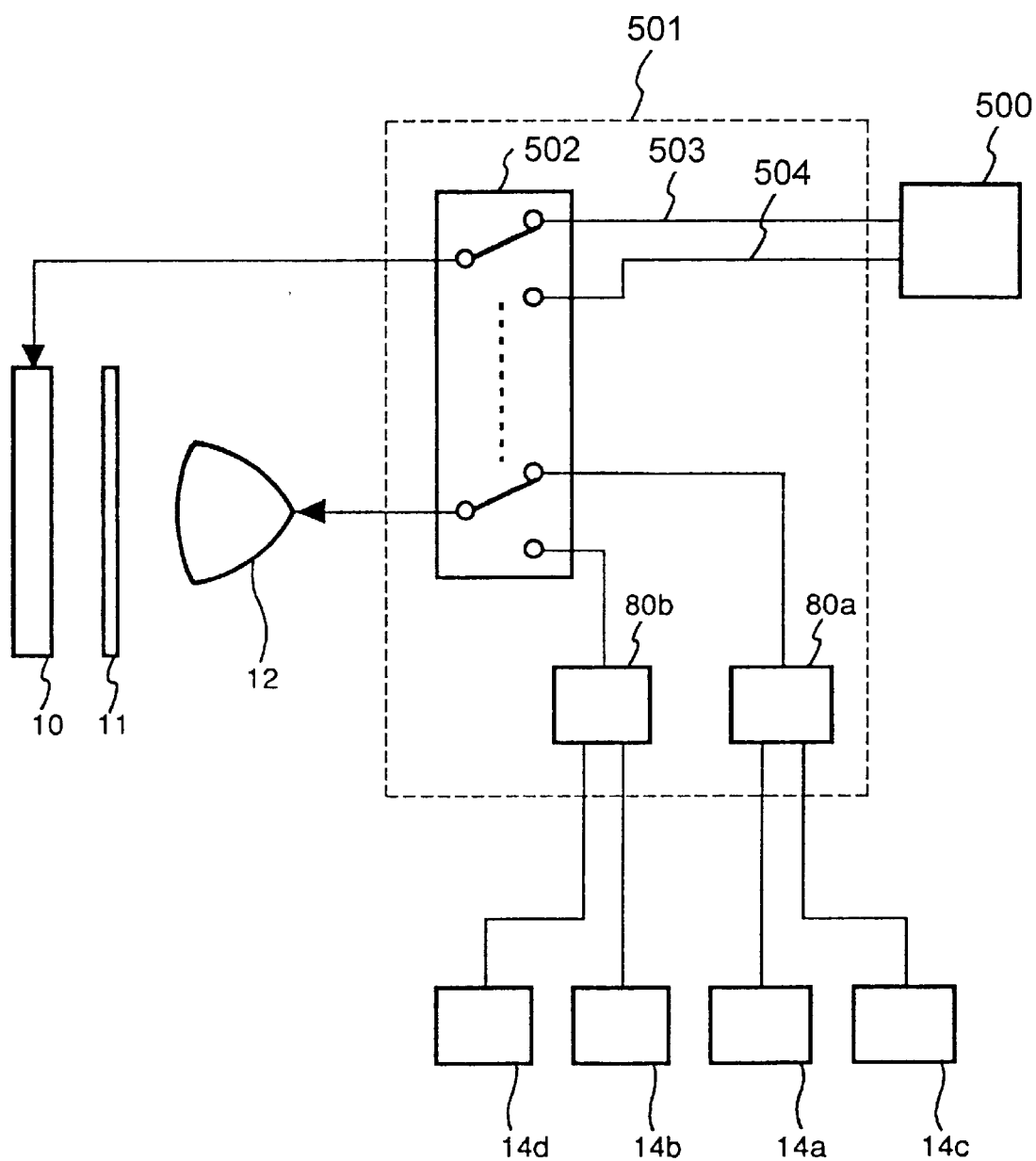
FIG. 9 is a functional block diagram illustrating a circuit for performing synchronization and image processing used in the second embodiment.

FIG. 9 is a functional block diagram of the processing circuit 501. In FIG. 9, the signal processing circuits 80a and 80b produce images of observers based on right-side face area images 14a and 14c and left-side face area images 14b and 14d output by the observer's-image taking unit 502. The stereoscopic image output device 500 provides an image 503 for right eyes and an image 504 for left eyes to a time-division multiplexing circuit 502. The time-division multiplexing circuit 502 also receives output signals from the signal processing circuit 80a and 80b. The time-division multiplexing circuit 502 selects the right-side face area image 80a so that it is displayed as back light on the black-and-white CRT 12. At the same time, the time-division multiplexing circuit 502 selects the image 503 for right eyes and transfers it to the spatial modulation device 10. Then, the time-division multiplexing circuit 502 selects the left-side face area image 80b so that it is displayed as back light on the black-and-white CRT12, and at the same time selects the image 504 for right eyes and transfers it to the spatial modulation device 10. In this way, a stereoscopic image is provided to each observer.

Furthermore, the technique of differential processing associated with right-side and left-side face areas described above in connection with the first embodiment may also be applied to this seventh embodiment.

Further, the technique of the second embodiment can be applied to an endoscope.

THIRD EMBODIMENT

Figure 10:
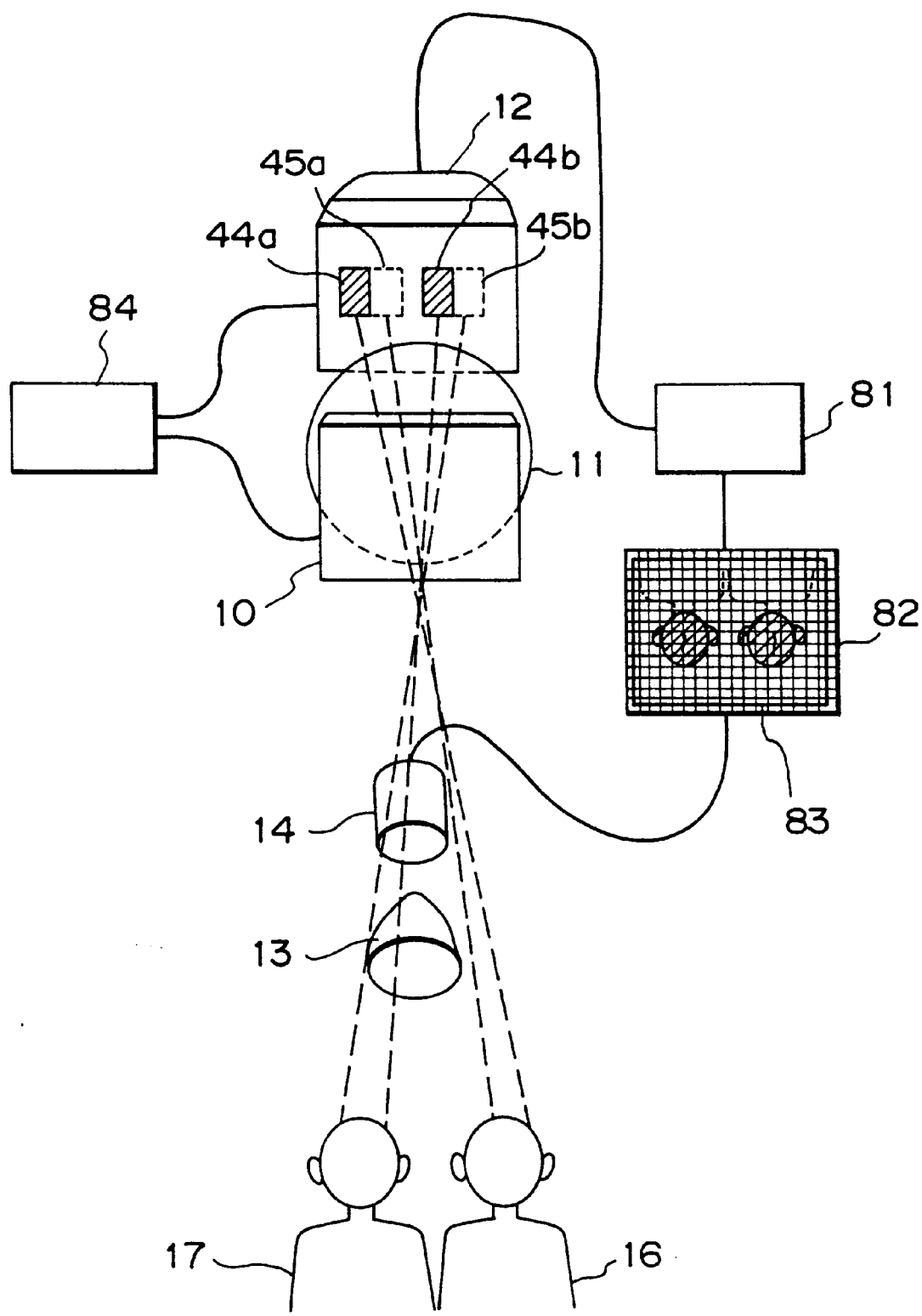
FIG. 10 is a schematic diagram illustrating a third embodiment of a stereoscopic-image display system according to the present invention.

FIG. 10 illustrates the construction of the third embodiment of a stereoscopic-image display system, including: a transmission-type liquid crystal display 10 serving as a spatial modulation device; and Fresnel lens 11, serving as optical element, having a focal length of 150 mm disposed at the back of the spatial modulation device 10; a black-and-white CRT 12 serving as an illuminating image display device which emits light for illumination, wherein the black-and-white CRT 12 is disposed opposite to the spatial modulation device 10 via the lens 11 at a position 160 mm far from the lens 11; an LED light source 13 serving as an illuminating light source of wavelength of 850 nm; and a black-and-white CCD camera 14 serving as a picture-taking apparatus. In FIG. 10, there are also shown observers 16 and 17 who observe a stereoscopic image. Furthermore, the system also includes: an image output device 81; and a bright-point coordinate detector 82 for detecting pixels or bright points of images which are obtained via the black-and-white CCD camera 14 and displayed on a black-and-white liquid crystal display 83. Based on these position's coordinates, images 44a and 44b are displayed on the black-and-white CRT 12 so that these images act as back-light illuminating an image viewed by right eyes of the observers 16 and 17, and images 45a and 45b are displayed on the black-and-white CRT 12 so that these images act as back-light illuminating an image viewed by left eyes of the observers 16 and 17.

The entire faces of the observers are illuminated from the front side with an infrared LED 13. Face images of the observers are obtained via the black-and-white CCD camera 14 provided with a wavelength filter corresponding to the wavelength of the LED 13. The output of the black-and-white CCD camera 14 is connected to black-and-white liquid crystal display 83 so that the face images of the observers are displayed as bright points on the black-and-white liquid crystal display 83.

A two-dimensional position sensor (bright-point coordinate detector) 82 for detecting coordinates of bright points is disposed at the front of the panel of the black-and-white liquid crystal display 83. The position coordinates of observer's face images displayed on the black-and-white liquid crystal display 83 are detected in real time by the two-dimensional position sensor 82, and sent to the image output device 81.

Based on the number and coordinates of face images detected by the two-dimensional position sensor (bright-point coordinate detector) 82, the image output device 81 outputs specific images acting as back-lighting devices to the black-and-white CRT 12.

Furthermore, the system also includes: a black-and-white liquid crystal display 83 for displaying face images obtained via the black-and-white CCD camera 14; and a bright-point coordinate detector 82 for detecting pixels or bright points forming the image displayed on the black-and-white liquid crystal display 83. The detected position coordinates of the bright points are transferred to an image output device 81. These bright points act as measures indicating positions of observers and their face sizes. The image processing unit 81 determines face sizes of observers from the number of bright points detected by the detector 82, and determines right-eye images as well as left-eye images having sizes corresponding to the above face sizes. These images have been prepared beforehand and are stored in the image processing unit 81.

Face images of the observers 16 and 17 obtained via the camera 14 are displayed on the black-and-white liquid crystal display 83 as described above. The bright-point coordinate detector 82 detects the position coordinates of these images as bright points, and transfers the results to the image output device 81. Then, these are displayed on the black-and-white CRT 12 as images 44a and 44b acting as back-lighting devices for right eyes of the observers 16 and 17. Furthermore, portions acting as the back-lighting devices 45a and 45b for the left eyes of the observers 16 and 17 are displayed on the black-and-white CRT 12 wherein the image output device 81 determines whether the positions of these images correspond to right eyes or left eyes. In the above displaying processing, the synchronous circuit 84 performs synchronization between target images displayed on the spatial modulation device 10 and images (back-light) for right and left eyes displayed on the black-and-white CRT 12. As for the light source and camera, the system of this tenth embodiment needs only one light source and one camera.

The shapes and sizes of the specific images 44a and 45b are optimized such that these images can serve as back-lighting devices which allow the observers 16 and 17 to correctly discriminate a right image from a left image. The black-and-white liquid crystal display 83 may be replaced with a CRT, plasma display, or LEDs arranged in a matrix fashion.

FOURTH EMBODIMENT

In any of the first through third embodiments, the Fresnel lens 11 is separate from the liquid crystal display device 10. In contrast, in a fourth embodiment described below, a Fresnel lens and a liquid crystal display device are formed in an integral fashion thereby achieving a reduction in the system size.

Figure 11:
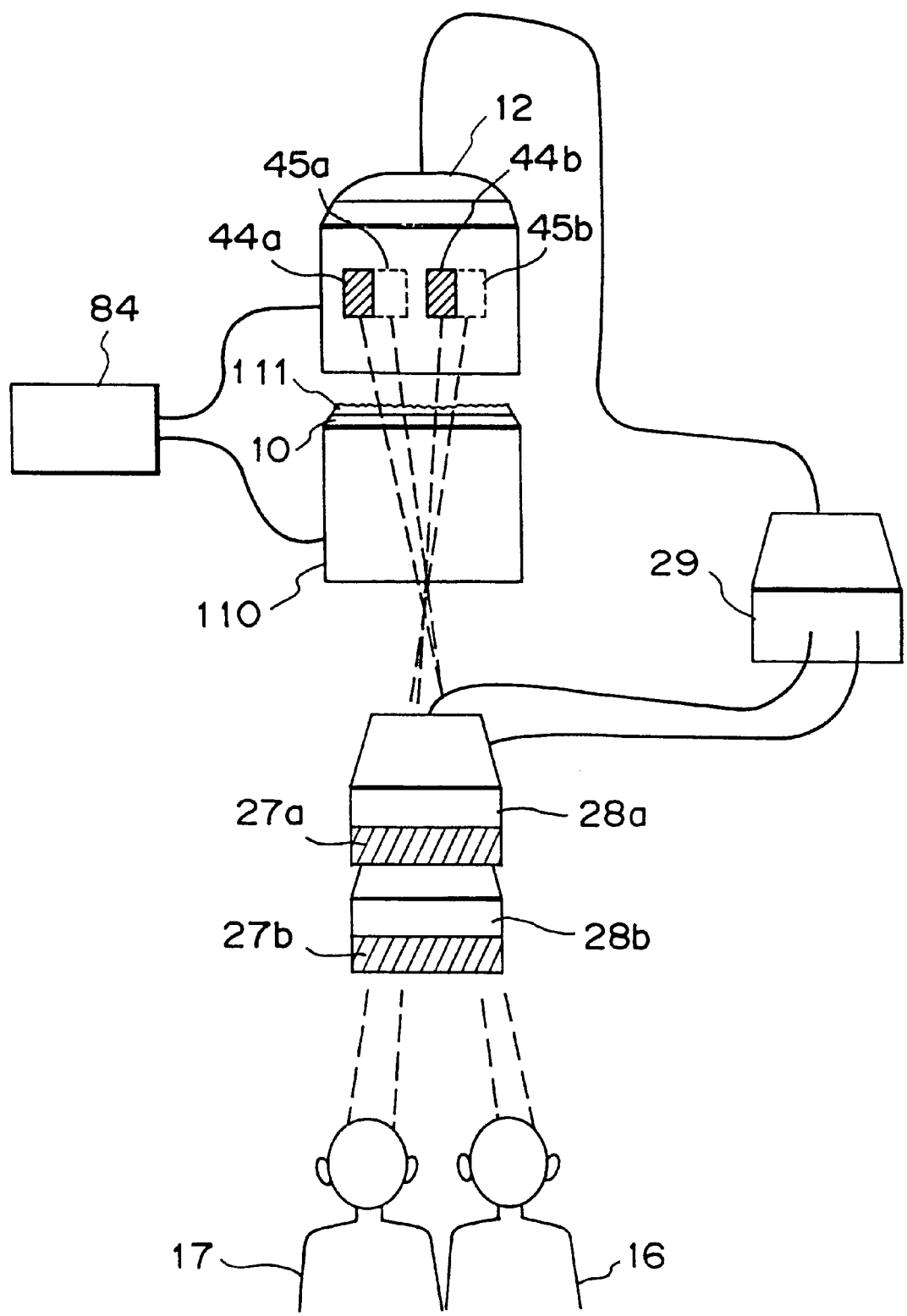
FIG. 11 is a schematic diagram illustrating a fourth embodiment of a stereoscopic-image display system according to the present invention.

Referring to FIG. 11, the fourth embodiment of the present invention will be described below.

The system has a transmission-type liquid crystal display 110 a back surface of which a Fresnel lens 111 is integrally provided, whose focal length is 150 mm. The system further includes: ultrasonic wave generators 27a and 27b for generating ultrasonic waves having frequencies of 100 kHz and 120 kHz, respectively, toward observers 16 and 17; ultrasonic wave detectors 28a and 28b for detecting ultrasonic waves generated by the ultrasonic wave generators wherein the ultrasonic wave detector 28a selectively detects only an ultrasonic wave having a frequency corresponding to that of the ultrasonic wave generator 27a, and the ultrasonic wave detector 28b selectively detects only an ultrasonic wave having a frequency corresponding to that of the ultrasonic wave generator 27b; and an ultrasonic wave image output device 29. In FIG. 11, reference numerals 44a, 44b, 45a, and 45b denote images corresponding to right-side face areas and left-side face areas of observers 16 and 17 displayed on the black-and-white CRT 12 wherein these areas are such areas of the black-and-white CRT 12 which emit light for back-light illumination.

the ultrasonic wave image output device 29 performs control so that the spatial modulation device 10 is driven by a video signal for the right-side face areas when images 44a and 44b corresponding to the right-side face areas are displayed on the black-and-white CRT. That is, when back-light images corresponding to right-side face areas are displayed on the black-and-white CRT, the synchronous circuit allows an image for right eyes to be displayed on the spatial modulation device 10, and when the back-light images are changed to images (45a, 45b) corresponding to left-side face areas, the synchronous circuit changes the image displayed on the spatial modulation device 10 to an image for left eyes.

In the fourth system, two ultrasonic waves having different wavelengths generated by the ultrasonic wave generator 27a and 27b are reflected from two observers, and detected by the ultrasonic wave detectors 28a and 28b, respectively. From the detected signals, the ultrasonic wave image output device 29 calculates the positions of images corresponding to right-side and left-side face areas of the observers to be displayed on the black-and-white CRTs 12a and 12b, and then outputs predetermined images for right-side faces and images for left-side faces to the black-and-white CRT 12, so as to display these images on the black-and-white CRT 12. In this processing, it is easy to display only images corresponding to observers' faces on the black-and-white CRT 12 and display nothing other than those images. Therefore, it is possible to prevent crosstalk between right and left images in which the left eye (right eye) gets weak perception of the right-eye (left-eye) image due to disturbance in light.

In FIG. 11, the spatial modulation device (LCD) 110 has the Fresnel lens 111 on the back side. Many variations of a combination of a liquid crystal device and a Fresnel lens may be possible. Some examples of such variations will be described below.

Figure 12:
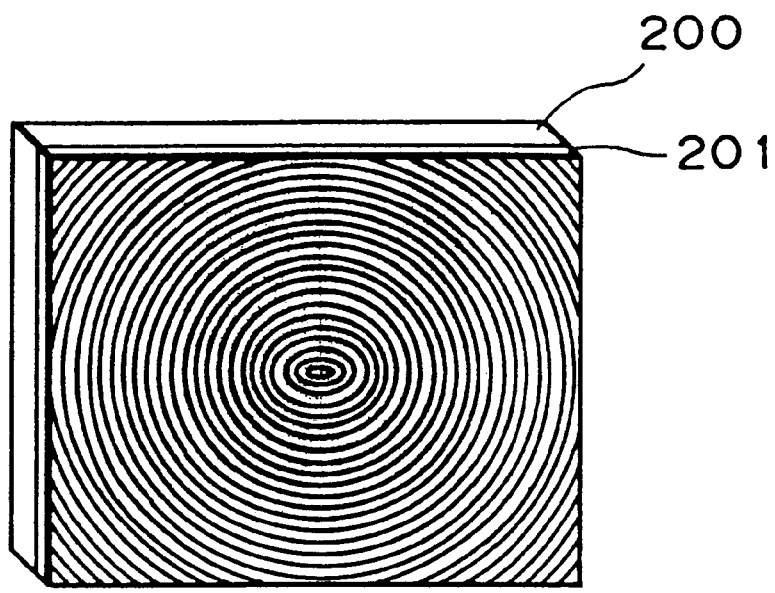
FIGS. 12 and 13 are schematic diagrams illustrating an example of an element used in the fourth embodiment.
Figure 13:
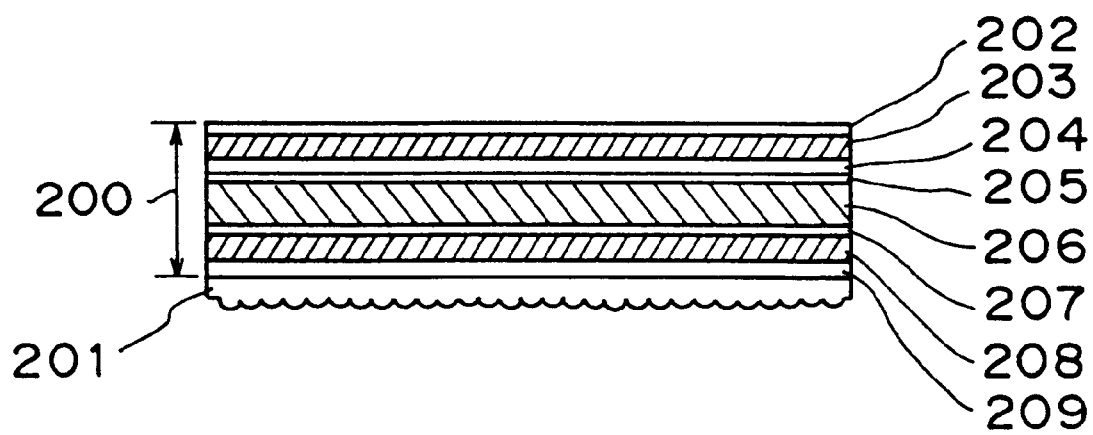

FIG. 12 is a perspective view illustrating the entire appearance of a display device comprising a liquid crystal device 200 and a Fresnel lens 201 looking like circular bands wherein the Fresnel lens 201 is bonded to the liquid crystal device 200. FIG. 13 is a cross-sectional view illustrating the structure of the display device in which the Fresnel lens 201 is bonded to the back face of the liquid crystal device 200.

As shown in FIG. 13, polarizing filters 202 and 209 for polarizing light are disposed at the most outer sides of the liquid crystal device 200 so that optical properties of the liquid crystal can be used in conjunction with the polarizing filters 202 and 209. Glass substrates 203 and 208 for encapsulating the liquid crystal are disposed inside the polarizing filters 202 and 209. Inside the glass substrates, a color filter 204 is disposed as required. At further inner positions, transparent electrodes 205 and 207 for applying a required electric field to the liquid crystal are disposed wherein the liquid crystal 206 is disposed between these transparent electrodes 205 and 207. If a Fresnel lens 201 is bonded to the liquid crystal device 200 constructed in the above-described manner, then a structure whose cross section is shown in FIG. 13 is obtained.

In this structure in which the Fresnel lens 201 is bonded to the back face of the liquid crystal device 200, the space and holder required for installing the lens become unnecessary. Furthermore, this structure leads to a reduction in the total system size.

Figure 14A:
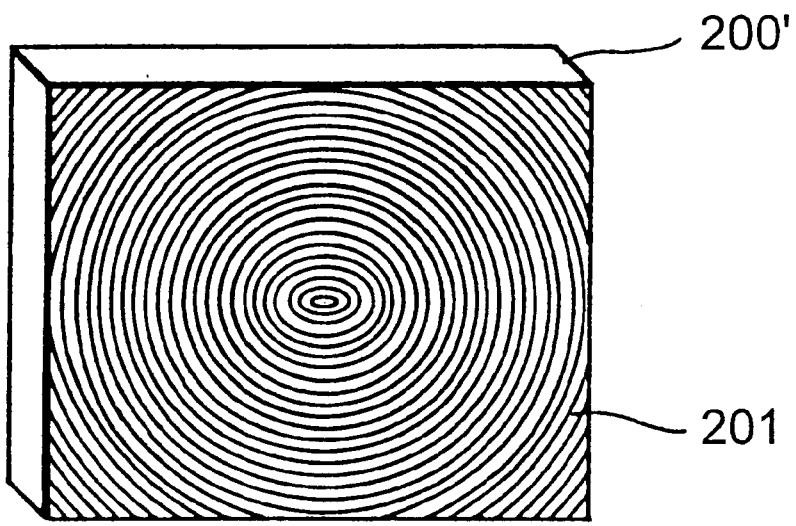
FIGS. 14A and 14B are schematic diagrams illustrating a modified example of the element shown in FIGS. 12 and 13.
Figure 14B:
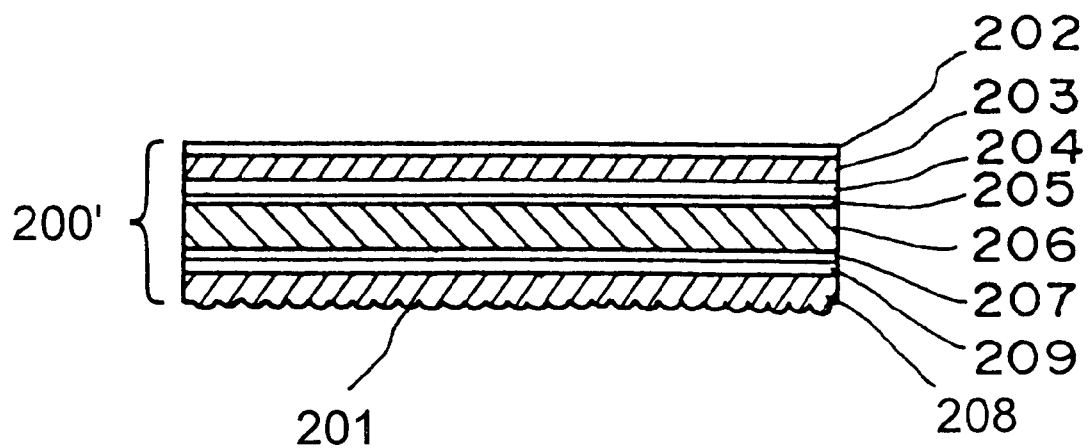

FIG. 14A illustrates another example in which a circular band pattern similar to that shown in FIG. 12 is formed in an integral fashion on a glass substrate disposed at the most outer position. As shown in FIG. 14B, this liquid crystal device also has polarizing filters 202 and 209 for polarizing light such that optical properties of the liquid crystal can be used in conjunction with the polarizing filters 202 and 209. However, as for the side on which the circular band pattern is formed, the glass substrate 208 is disposed at the most outer position, and the polarizing filter 209 is disposed next to the glass substrate 208, thus providing an LCD display 200. Therefore, one of two glass substrates used to encapsulate the liquid crystal is disposed next to the most outer layer. At further inner positions, transparent electrodes 205 and 207 for applying a required electric field to the liquid crystal are disposed wherein the liquid crystal 206 is disposed between these transparent electrodes 205 and 207. A Fresnel lens 201 is bonded to the liquid crystal device 200 constructed in the above-described manner, and thus a structure whose cross section is shown in FIG. 13 is complete.

The circular band pattern can be formed by performing etching directly on a glass plate, or by forming a pattern in a resin layer coated on the outer resin surface of the liquid crystal by means of compression-pattern-transferring.

MODIFICATIONS OF TIME-DIVISION CONTROL

There will be shown below three examples of display systems in which modified time-division control techniques similar to those used in the embodiment s described in connection with FIGS. 3–11.

MODIFICATION 1

Figure 15:
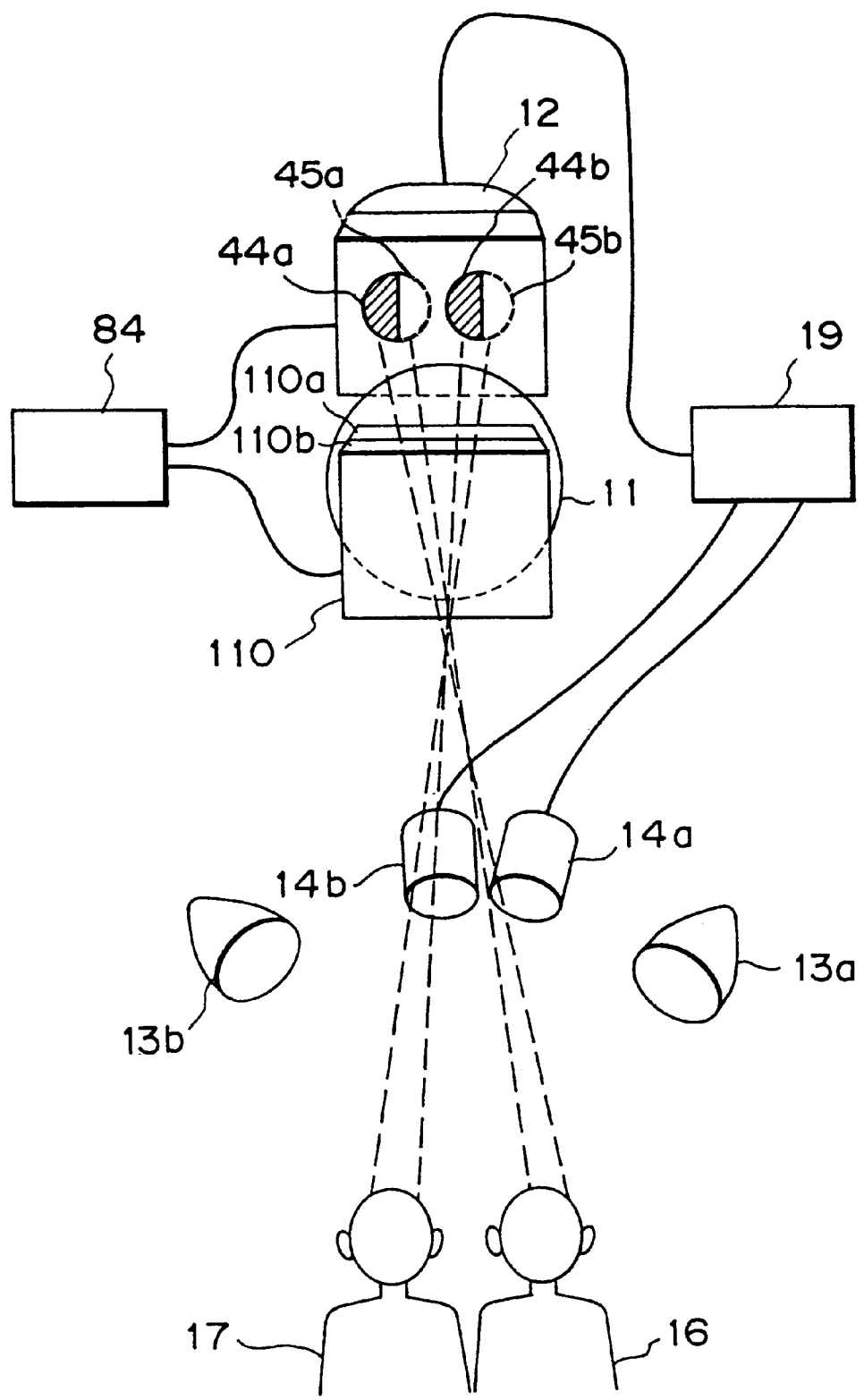
FIG. 15 is a schematic diagram illustrating a modified system of the 1 embodiment shown in FIG. 3.

FIG. 15 illustrates a modification of the first embodiment described above in connection with FIG. 3.

As shown in FIG. 15, this modified system includes: a transmission-type liquid crystal display 110 serving as a spatial modulation device which comprises a first liquid crystal layer 110a and a second liquid crystal layer 110b placed on the first liquid crystal layer 110a via an insulating layer; Fresnel lens 11, serving as optical element, having a focal length of 150 mm disposed at the back of the spatial modulation devices 110a and 110b, and black-and-white CRT 12 serving as a back-lighting device for emitting light corresponding to images associated with observers, wherein the black-and-white CRT 12 is disposed opposite to the spatial modulation devices 110a and 110b via the lens 11 at a position 160 mm far from the lens 11; LED light sources 13a and 13b serving as illuminating light sources which emit light having wavelengths 850 nm and 950 nm, respectively; and black-and-white CCD cameras 14a and 14b serving as apparatus for taking pictures. In FIG. 15, there are also shown observers 16 and 17 who observe a stereoscopic image. Numeral 19 denotes an image processing apparatus.

In this modification 1, video signals associated with face images of observers 16 and 17 obtained separately via cameras 14a and 14b are applied to the image processing unit 19. The image processing unit 19 detects the positions corresponding to right-side face areas and left-side face areas from the above video signal, and alternatively displays two back-light images on the CRT 12 at positions corresponding to the detected two positions so that these two back-light images can function as illumination sources which allow the observers 16 and 17 to correctly discriminate a right image from a left image. These back-light images illuminate the spatial modulation device 110 as follows. The image processing unit 19 alternately displays an image to be viewed by right eyes on the first liquid crystal layer 110a and an image to be viewed by left eyes on the second liquid crystal layer 110b, and provides output signals associated with the right-side face areas or the left-side face areas to the CRT in synchronism with the above images to be viewed by right or left eyes under the control of the synchronous circuit 84.

thus, displaying the target images for the right and left eyes on the LCD 110 in a time-division fashion provides the reduction of after image phenomenon for each display on the LCD. In this way, a stereoscopic image is provided to observers via the liquid crystal layer.

Figure 16A:
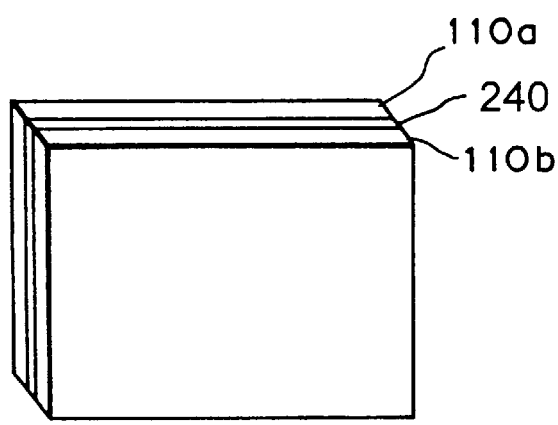
FIGS. 16A and 16B are schematic diagrams illustrating an example of an element used in modifications 1 through 3.
Figure 16B:
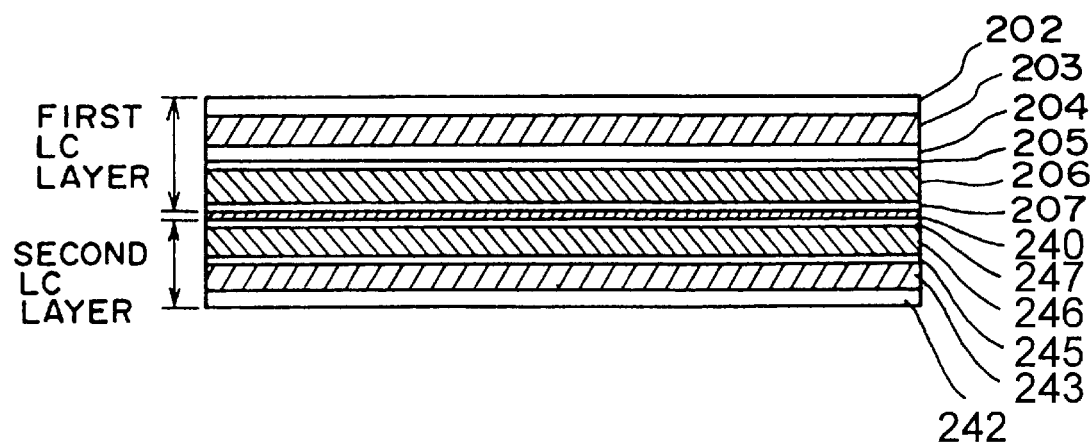

Referring to FIGS. 16A and 16B, there will be explained below the structure of the transmission-type liquid crystal display 110 serving as the spatial modulation device comprising the first liquid crystal layer 110a and the second liquid crystal layer 110b placed on the first liquid crystal layer 110a via the insulating layer.

FIG. 16A is a perspective view illustrating the entire appearance of the liquid crystal display 110, in which reference numerals 110a and 110b denote the first and second liquid crystal layers, respectively. Reference numeral 240 denotes the insulating layer providing electric isolation between electrodes formed on the above-described two liquid crystal layers.

FIG. 16B is a cross-sectional view of the liquid crystal display 110. In the first liquid crystal layer, as shown in FIG. 16B, a polarizing filter 202 which polarizes light so that optical properties of the liquid crystal can be used is disposed at the most outer position, a glass substrate 203 for encapsulating the liquid crystal is disposed inside the polarizing filters 202, and a color filter 204 is disposed under the glass substrate 203 as required. Inside the color filter 204, the liquid crystal 206 is disposed between transparent electrodes 205 and 207.

The second liquid crystal layer 110b is disposed next to the first liquid crystal layer 110a via an insulating layer 240. In the second liquid crystal layer 110b, a liquid crystal 246 is disposed next to the insulating layer 240 between transparent electrodes 245 and 247, and a glass substrate 243 for encapsulating the liquid crystal 246 is disposed next to the liquid crystal 246. Furthermore, a polarizing filter 242 is disposed at the most outer position. That is, the first liquid crystal layer is composed of elements from the polarizing filter 202 through the transparent electrode 207, and the second liquid crystal layer 110b composed of elements from the transparent electrode 247 through the polarizing filter 242 is disposed adjacent to the first liquid crystal layer via the insulating layer 240.

The liquid crystal display of the two-layer type described here in modification 1 is suitable for use in a system in which images are displayed on a single liquid crystal device.

MODIFICATION 2

Figure 17:
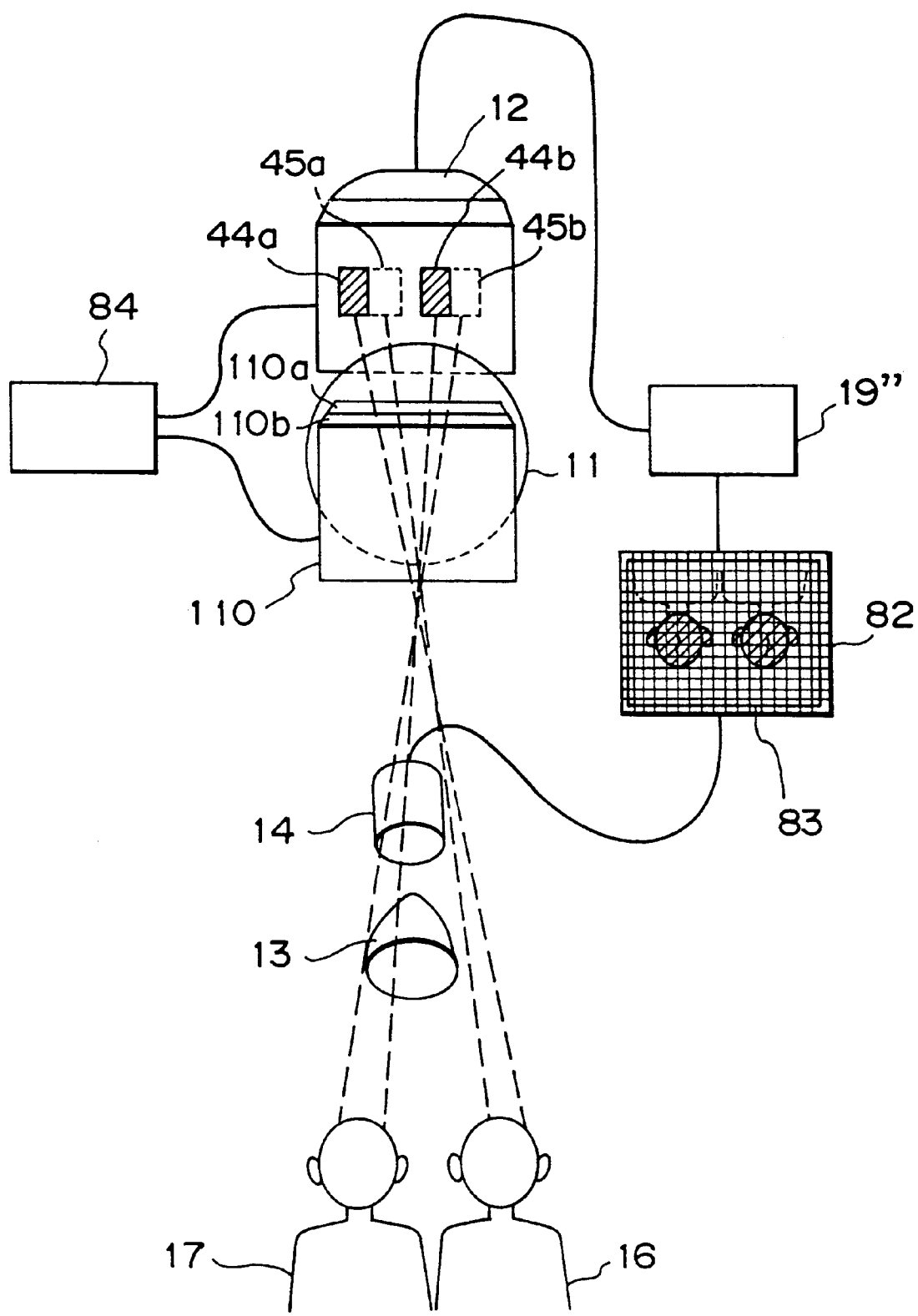
FIG. 17 is a schematic diagram illustrating a display system in which a two-layer liquid crystal display is applied to the third embodiment of the image display system shown in FIG. 10.

FIG. 17 illustrates the construction of a modified display system in which the above two-layer liquid crystal display is applied to the image display system of the embodiment described in connection with FIG. 10.

As shown in FIG. 17, the system includes: a transmission-type liquid crystal display 110 serving as a spatial modulation device comprising a first liquid crystal layer 110a and a second liquid crystal layer 110b placed on the first liquid crystal layer 110a via an insulating layer; a Fresnel lens 11, serving as optical element, having a focal length of 150 mm disposed at the back of the spatial modulation device 110; a black-and-white CRT 12 serving as an illuminating image display device which emits light for illumination, wherein the black-and-white CRT 12 is disposed opposite to the spatial modulation devices 110 via the lens 11 at a position 160 mm far from the lens 11; and LED light source 13 serving as an illuminating light source of wavelength of 850 nm; and a black-and-white CCD camera 14 serving as a picture-taking apparatus. In FIG. 17, there are also shown observers 16 and 17 who observe a stereoscopic image. The system further includes: an image processing unit 19'; and a bright-point coordinate detector 82 which detects pixels or bright-point coordinates of face images which are obtained via the black-and-white CCD camera 14 and displayed on a black-and-white liquid crystal display 83, and sends detected bright-point coordinates to the image processing unit 19'. In FIG. 17, areas 44a and 44b on the screen of the black-and-white CRT 12 are back-light images displayed on the black-and-white CRT 12 wherein these back-light images illuminate an image to be viewed by right eyes of observers 16 and 17, that is, these areas 44a and 44b are light emitting areas of the black-and-white CRT 12. Similarly, areas 45a and 45b on the screen of the black-and-white CRT 12 are back-light images displayed on the black-and-white CRT 12 wherein these back-light images illuminate an image to be viewed by left eyes of observers 16 and 17. Video signals of face images of the observers 16 and 17 obtained via the camera 14 are displayed on the black-and-white liquid crystal display 83 as described above. The bright-point coordinate detector 82 detects the bright points of these images. The detected positions of the bright points are input to the image processing unit 19'. The image processing unit 19' then determines image sizes and positions on the black-and-white CRT 12 at which the image to be displayed. Thus, the images 44a and 44b acting as back-light for right eyes of the observers 16 and 17 are displayed on the CRT as shown in FIG. 17. Subsequently, back-light images for left eyes of the observers 16 and 17 are displayed. That is, the image processing unit 19' determines whether the positions correspond to right eyes of left eyes, and back-light images 45a and 45b are displayed on the black-and-white CRT according to the determination result. In the above displaying processing, the synchronous circuit 84 performs synchronization between an image displayed on the spatial modulation device and (back-light) images for right and left eyes displayed on the black-and-white CRT 12. As for the light source and camera, the system needs only one light source and one camera. Furthermore, in this system, unlike the first embodiment described earlier, only one black-and-white CRT, one Fresnel lens, and one spatial modulation device are used, and a half mirror for producing a composite image is not necessary.

MODIFICATION 3

Figure 18:
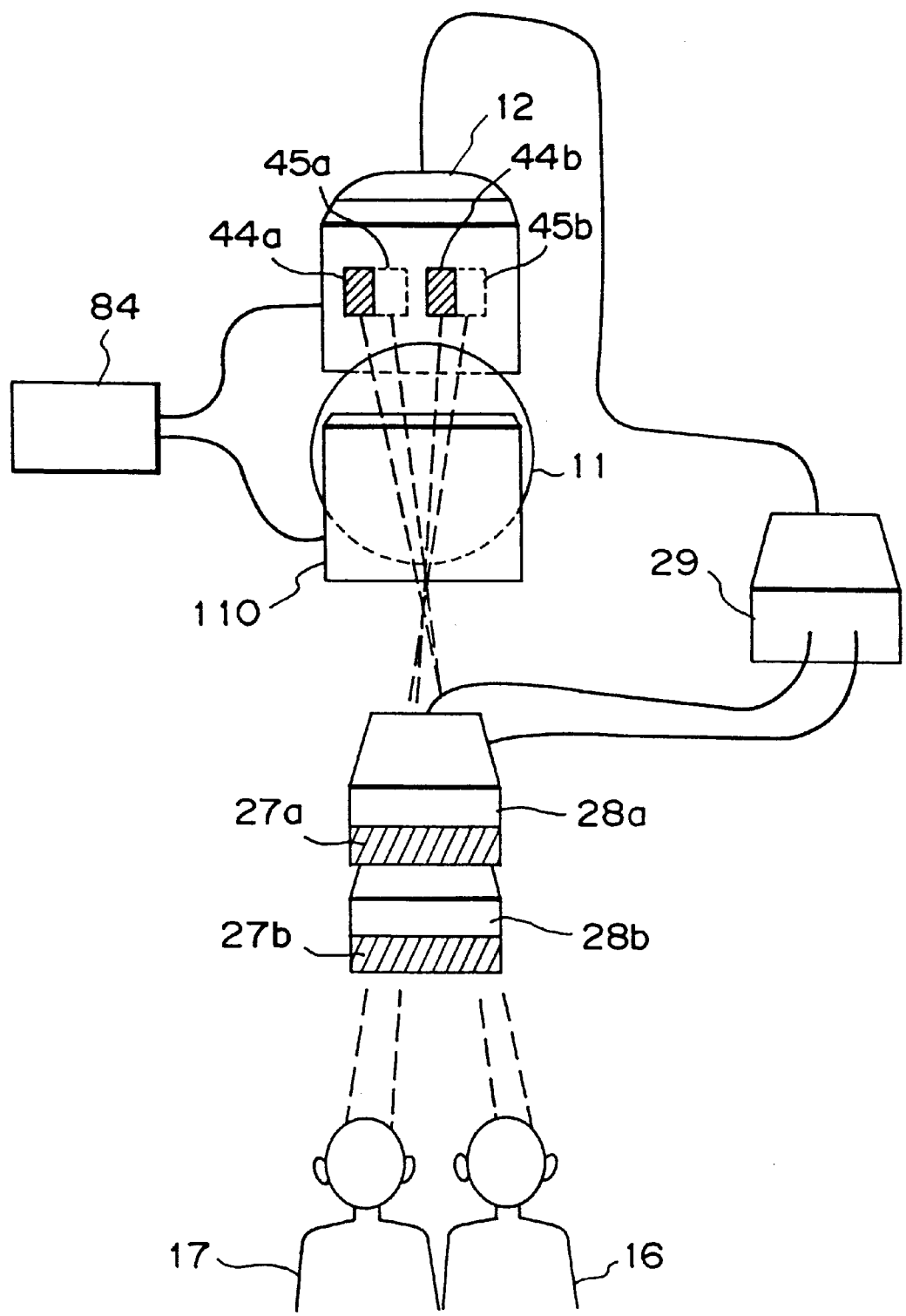
FIG. 18 is a schematic diagram illustrating a display system in which a two-layer liquid crystal display is applied to the fourth embodiment of the image display system shown in FIG. 11.

FIG. 18 illustrates the construction of a third modified display system in which the above two-layer liquid crystal display is applied to the image display system of the embodiment described in connection with FIG. 10 (in which observers' positions are detected using ultrasonic waves).

As shown in FIG. 18, the system includes: ultrasonic wave generators 27a and 27b for generating ultrasonic waves having frequencies of 100 kHz and 120 kHz, respectively, toward observers 16 and 17; ultrasonic wave detectors 28a and 28b for detecting ultrasonic waves generated by the ultrasonic wave generators wherein the ultrasonic wave detector 28a selectively detects only an ultrasonic wave having a frequency corresponding to that of the ultrasonic wave generator 27a, and the ultrasonic wave detector 28b selectively detects only an ultrasonic wave having a frequency corresponding to that of the ultrasonic wave generator 27b; and an ultrasonic wave image output device 29. In FIG. 18, reference numerals 44a, 44b, 45a, and 45b denote images corresponding to right-side face areas and left-side face areas of observers 16 and 17 displayed on the black-and-white CRT 12 wherein these areas are such areas of the black-and-white CRT 12 which emit light for back-light illumination.

The ultrasonic wave image output device 29 performs control so that the spatial modulation device 110 is driven by a video signal for the right-side face areas when images 44a and 44b corresponding to the right-side face areas are displayed on the black-and-white CRT. That is, when back-light images 44a and 44b are displayed on the black-and-white CRT, the synchronous circuit 84 allows an image for right eyes to be displayed on the spatial modulation device 110, and when the back-light images are changed to images (graphics) 45a, 45b, the synchronous circuit changes the image displayed on the spatial modulation device 110 to an image for left eyes.

In this third modified system, two ultrasonic waves having different frequencies generated by the ultrasonic wave generators 27a and 27b are reflected from two observers, and detected by the ultrasonic wave detectors 28a and 28b, respectively. From the detected signals, the ultrasonic wave image output device 29 calculates the positions of images corresponding to right-side and left-side face areas of the observers to be displayed on the black-and-white CRTs 12a and 12b, and then outputs predetermined images for right-side faces and images for left-side faces to the black-and-white CRT 12, so as to display these images on the black-and-white CRT 12. In this processing, it is easy to display only images corresponding to observers' faces on the black-and-white CRT 12 and display nothing other than those images. Therefore, it is possible to prevent crosstalk between right and left images in which the left eye (right eye) gets weak perception of the right-eye (left-eye) image due to disturbance in light.

In the three modifications described above, the techniques described earlier such as the technique of performing differential processing between right-side and left-side face images displayed on back-lighting devices, and the technique in which half-face images of observers are taken using only one CCD camera, and then this half-face images are displayed on one of back-lighting devices, and negative-to-positive inverted images of the above half-face images are displayed on the other back-lighting device, may also be employed.

MODIFICATIONS OF BACK-LIGHTING DEVICES

Figure 19:
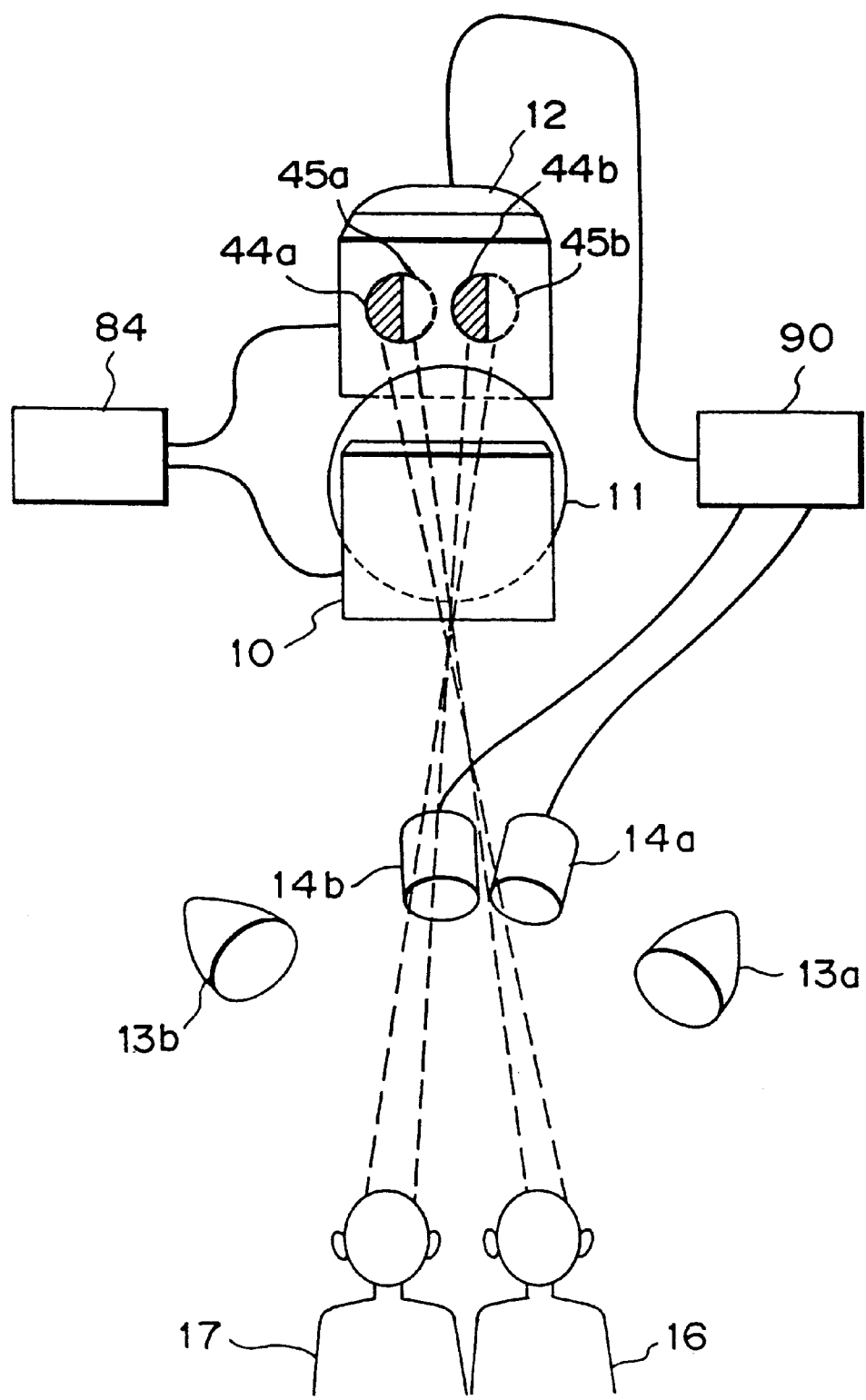
FIG. 19 is a schematic diagram illustrating a display system in which back-lighting devices capable of displaying two-level back-light images are used.

FIG. 19 illustrates the construction of a picture-taking system in which a modified back-lighting device is used.

The system shown in FIG. 19 has a similar construction to that of the fourth embodiment shown in FIG. 15, except for that the FIG. 19 system includes a spatial modulation device 10 and a Fresnel lens 11 (as optical element). The operation of an image output apparatus 90 is different that of the apparatus 19 of FIG. 15, which will be described below.

Referring to FIGS. 20A and 20B, two-level value representation of an image according to FIG. 19 system will be described below.

Two-level gradation black-and-white liquid crystal display 12 provides with a high-brightness back-lighting device which is always lighted wherein light emitted from the back-lighting device is passed through or blocked off by a liquid crystal shutter. A fluorescent lamp, metal halide lamp, or the like can be used here as the back-lighting device.

In the case of multilevel gradation display systems such as the black-and-white CRT 12 used in the previous embodiments, images of portions other than a half-face area are also displayed as shown n FIG. 20A. In the present invention, however, it is undesirable that images other than a half-face area are displayed as a back-lighting device.

In contrast, when a two-level gradation black-and-white liquid crystal display is used, images having brightness levels less than a predetermined threshold level are automatically cut off and not displayed. Thus, the portions having the cross sections denoted by "Image Cross Section 1" in FIG. 20A are not displayed. As for the portions having the cross sections denoted by "Image Cross Section 2", their peripheral areas are cut out and images having cross sections denoted by "Image Cross Section 3" in FIG. 20B are displayed. As can be seen from the above discussion, if a two-level gradation black-and-white liquid crystal display which is usually used for displaying characters is used as the observer's-image display device instead of the black-and-white CRT, displaying of two-level face images are easily achieved and thus only high-brightness portions of half-face areas which are essential as back-lighting devices are selectively displayed whereby crosstalk between right and left images is suppressed.

In this modified system, two ultrasonic waves having different wavelengths generated by the ultrasonic wave generators 27a and 27b are reflected from two observers, and detected by the ultrasonic wave detectors 28a and 28b, respectively. From the detected signals, the ultrasonic wave image output device 29 calculates the positions of images corresponding to right-side and left-side face areas of the observers to be displayed on the black-and-white CRTs 12a and 12b, and then outputs predetermined images for right-side faces and images for left-side faces to the black-and-white CRT 12, so as to display these images on the black-and-white CRT 12. In this processing, it is easy to display only images corresponding to observers' faces on the black-and-white CRT 12 and display nothing other than those images. Therefore, it is possible to prevent crosstalk between right and left images in which the left eye (right eye) gets weak perception of the right-eye (left-eye) image due to disturbance in light.

FURTHER MODIFICATIONS

In the embodiments described above in connection with FIGS. 3 through 19, observers' positions are detected using infrared light rays having different wavelengths (or ultrasonic waves having different frequencies), and corresponding images for left eyes are formed. For the above purpose, a pair of infrared LED light sources (13a, 13b), a pair of cameras (14a, 14b), and a pair of ultrasonic wave generators and detectors. Alternatively, infrared light rays having different wavelengths (or ultrasonic waves different frequencies) may be emitted at different times using only one infrared LED light source or one ultrasonic wave generator.

Furthermore, the half mirror 15 for synthesizing images may be replaced with a prism system, and Fresnel lenses 11a, 11b may be replaced with concave mirrors.

The present invention is not limited to the above embodiments and various changes and modifications can be made within the spirit and scope of the present invention. Therefore, to appraise the public of the scope of the present invention, the following claims are made.

What is claimed is:

1. An image display system for providing first and second images such that a right eye and a left eye of an observer see the first and second images at different times, respectively, the image display system comprising:

image sensing means for sensing an image of the observer;

a spatial modulation device transparent to light, for displaying the first and second images at the different times, respectively;

generation means for generating a pair of back light images based on an image output signal from the image sensing means at the different times, respectively;

a back-lighting device which receives an output signal associated with the back light image generated by the back light image generation means and displays the back light images to illuminate the spatial modulation device from a back side thereof, at the different times;

synchronization means for synchronizing one of the first and second images present on the spatial modulation device with a generation of one of the pair of back light images by the generation means; and an optical element for giving directivity to back light emitted by the back-lighting device so that the back-lighting device provides back light illuminations of the spatial modulation device for the right and left eyes at the different times, wherein the generation means comprises:

image processing means for processing an image of the observer's whole face sensed by the image sensing means, detecting a centroid of the face area of the image of the observer, and then generating the pair of back light images on the basis of the detected centroid.

2. A display system according to claim 1, wherein the image sensing means includes:

an illuminating device for illuminating an observer's face with light having a specific wavelength;

cameras for sensing an image of the observer's face in such a manner that each camera selectively senses an image in response to light having the specific wavelength.

3. A display system according to claim 2, wherein the cameras are provided with a wavelength filter which selectively passes light having the specific wavelength emitted by the illuminating device.

4. A display system according to claim 1, wherein the back lighting device is disposed outside the focal length of the optical element.

5. A display system according to claim 1, wherein the optical element is disposed between the spatial modulation device and the back-lighting device.

6. A display system according to claim 1, wherein the spatial modulation device comprises a liquid crystal display device.

7. A display system according to claim 1, wherein:

the spatial modulation device inputs image signals representing the first and second images sensed by an endoscope device.

8. A display system according to claim 5, wherein the optical element is a convex lens, concave mirror or Fresnel lens.

9. A display system according to claim 1, wherein the image processing means generates graphic images corresponding to the right and left halves of the observer's face, respectively, so that the graphic images are opposed with respect to the detected centroid.

10. An image display system for providing first and second images such that a right eye and a left eye of an observer see the first and second images at different times, respectively, the image display system comprising:

image sensing means for sensing an image of the observer;

a spatial modulation device transparent to light, for displaying the first and second images at the different times, respectively;

generation means for generating a pair of back light images based on an image output signal from the image sensing means at the different times, respectively;

a back-lighting device which receives an output signal associated with the back light image generated by the back light image generation means and displays the back light images to illuminate the spatial modulation device from a back side thereof, at the different times;

synchronization means for synchronizing one of the first and second images present on the spatial modulation device with a generation of one of the pair of back light images by the generation means; and an optical element for giving directivity to back light emitted by the back-lighting device so that the back-lighting device provides back light illuminations of the spatial modulation device for the right and left eyes at the different times, wherein the generation means comprises:

image processing means for processing an image of the observer's whole face sensed by the image sensing means, detecting a centroid of the face area of the image of the observer, and then generating the pair of back light images by dividing the face image of the observer into left and right half images with the detected centroid being a reference with respect to the left and right half images.

* * * * *

UNITED STATES PATENT AND TRADEMARK OFFICE
CERTIFICATE OF CORRECTION

PATENT NO. : 6,115,058
DATED : September 5, 2000
INVENTOR(S) : Shigeru OMORI, et al.

It is hereby certified that error appears in the above-identified patent and that said Letters Patent is hereby corrected as shown below:

In section [56], the first U.S. Patent document cited should read "3,128,339".

In column 3, line 58, "observes" is changed to --observers--.

In column 6, line 7, "different" is changed to --difference--.

In column 7, line 41, "pair" is changed to --part--.

In column 9, line 16, insert "In" before --FIG. 5A--.

In column 9, line 32, "observes" is changed to --observers--.

Signed and Sealed this

Fifteenth Day of May, 2001

Attest:

NICHOLAS P. GODICI

Attesting Officer

Acting Director of the United States Patent and Trademark Office